United States Patent
Hirayama et al.

(10) Patent No.: US 12,548,643 B2
(45) Date of Patent: Feb. 10, 2026

(54) BRAIN NETWORK ACTIVITY ESTIMATION SYSTEM, METHOD OF ESTIMATING ACTIVITIES OF BRAIN NETWORK, BRAIN NETWORK ACTIVITY ESTIMATION PROGRAM, AND TRAINED BRAIN ACTIVITY ESTIMATION MODEL

(71) Applicant: ADVANCED TELECOMMUNICATIONS RESEARCH INSTITUTE INTERNATIONAL, Kyoto (JP)

(72) Inventors: Jun-ichiro Hirayama, Wako (JP); Takeshi Ogawa, Kyoto (JP); Hiroki Moriya, Kyoto (JP)

(73) Assignee: ADVANCED TELECOMMUNICATIONS RESEARCH INSTITUTE INTERNATIONAL, Kyoto (JP)

( * ) Notice: Subject to any disclaimer, the term of this patent is extended or adjusted under 35 U.S.C. 154(b) by 1080 days.

(21) Appl. No.: 16/766,965

(22) PCT Filed: Nov. 13, 2018

(86) PCT No.: PCT/JP2018/041950
§ 371 (c)(1),
(2) Date: May 26, 2020

(87) PCT Pub. No.: WO2019/102901
PCT Pub. Date: May 31, 2019

(65) Prior Publication Data
US 2021/0035665 A1 Feb. 4, 2021

(30) Foreign Application Priority Data
Nov. 27, 2017 (JP) .................. 2017-227094

(51) Int. Cl.
G16H 50/00 (2018.01)
A61B 5/00 (2006.01)
(Continued)

(52) U.S. Cl.
CPC .......... *G16H 10/60* (2018.01); *A61B 5/0042* (2013.01); *A61B 5/055* (2013.01); *A61B 5/372* (2021.01); *G16H 30/20* (2018.01); *G16H 50/00* (2018.01)

(58) Field of Classification Search
CPC ........ A61B 5/0042; A61B 5/055; A61B 5/372
(Continued)

(56) References Cited

U.S. PATENT DOCUMENTS

2014/0148657 A1* 5/2014 Hendler ............... A61B 5/0095
600/545

FOREIGN PATENT DOCUMENTS

| CN | 103345749 A | 10/2013 |
|---|---|---|
| JP | 2005-528 A | 1/2005 |
| JP | 2017-192425 A | 10/2017 |

OTHER PUBLICATIONS

Huster, René J., et al. "Methods for simultaneous EEG-fMRI: an introductory review." Journal of Neuroscience 32.18 (2012): 6053-6060. (Year: 2012).*

(Continued)

*Primary Examiner* — Olivia M. Wise
*Assistant Examiner* — Janna Nicole Schultzhaus
(74) *Attorney, Agent, or Firm* — BIRCH, STEWART, KOLASCH & BIRCH, LLP

(57) ABSTRACT

A brain network activity estimation system includes means for obtaining brain wave measurement data and functional magnetic resonance imaging measurement data simultaneously measured from a subject, means for constructing a feature estimation model which receives the brain wave measurement data as input data and determining a parameter which defines the feature estimation model, means for calculating a feature value for each module based on an output value from each module that is calculated when the brain wave measurement data is provided as the input data, means for calculating an image feature value for each brain network based on the functional magnetic resonance imaging measurement data, and means for determining one or more modules which express activities of a specific brain (Continued)

network among a plurality of modules by evaluating correlation between the feature value for each module and the image feature value for each brain network.

8 Claims, 23 Drawing Sheets

(51) Int. Cl.
    *A61B 5/055*     (2006.01)
    *A61B 5/372*     (2021.01)
    *G16H 10/60*     (2018.01)
    *G16H 30/20*     (2018.01)

(58) Field of Classification Search
    USPC .......................................................... 703/11
    See application file for complete search history.

(56) References Cited

OTHER PUBLICATIONS

Deligianni, F., Centeno, M., Carmichael, D.W. and Clayden, J.D. Relating resting-state fMRI and EEG whole-brain connectomes across frequency bands. Frontiers in Neuroscience, 8, p. 1-16. (Year: 2014).*

Kim, J.H., Lee, S.M. and Lee, S.H. Capacitive monitoring of bio and neuro signals. Biomedical Engineering Letters, 4, pp. 142-148. (Year: 2014).*

Marzbani, H., Marateb, H.R. and Mansourian, M . . . Neurofeedback: a comprehensive review on system design, methodology and clinical applications. Basic and Clinical Neuroscience, 7(2), p. 143-158 (Year: 2016).*

Deligianni, F., Centeno, M., Carmichael, D.W. and Clayden, J.D. Relating resting-state fMRI and EEG whole-brain connectomes across frequency bands. Frontiers in Neuroscience, 8, p. 258. (Year: 2014).*

Hirayama et al., "Splice: Fully Tractable Hierarchical Extension of ICA with Pooling", Proceedings of the 34th International Conference on Machine Learning, PMLR 70, 2017, p. 491-1500.

Karahan et al., "Tensor Analysis and Fusion of Multimodal Brain Images", Proceedings of the IEEE, Sep. 2015, vol. 103, No. 9, p. 1531-1559.

Murta et al., "Electrophysiological Correlates of the Bold Signal for EEG-Informed fMRI", Human Brain Mapping, 2014, vol. 36, No. 1, p. 391-414.

Yeo et al., "The organization of the human cerebral cortex estimated by intrinsic functional connectivity", J. Neurophysiol, vol. 106, 2011, p. 1125-1165.

Extended European Search Report mailed Nov. 16, 2021 in counterpart European Application No. 18880259.9.

Peng Sun et al., "Joint EEG-fMRI model for EEG source separation", 2014 IEEE International Conference on Systems, Man, and Cybernetics (SMC), IEEE, (Oct. 5, 2014), pp. 2234-2239.

\* cited by examiner (a) (b)

(a)

(b)

BRAIN NETWORK ACTIVITY ESTIMATION SYSTEM, METHOD OF ESTIMATING ACTIVITIES OF BRAIN NETWORK, BRAIN NETWORK ACTIVITY ESTIMATION PROGRAM, AND TRAINED BRAIN ACTIVITY ESTIMATION MODEL

TECHNICAL FIELD

The present invention relates to a technology for estimating activities of a brain network based on brain wave measurement data.

BACKGROUND ART

An approach to non-invasive measurement of brain activities is broadly categorized into two types of a method of measuring bloodstream such as functional magnetic resonance imaging (fMRI) or near infrared spectroscopy (NIRS) and an electromagnetic field measurement method of obtaining electroencephalogram (which is also abbreviated as "EEG" below) or magnetoencephalography (which is also abbreviated as "MEG" below). For the sake of convenience of description, variation in signal (a time waveform) measured in EEG measurement and MEG measurement is herein collectively referred to as "brain waves."

Of these measurement approaches, EEG measurement is more advantageous than other measurement approaches in portability, mobility, price, and possibility of wide spread use. A general-purpose machine learning approach to determination of a cerebral model by such EEG measurement has been proposed (for example, NPL 1).

Presence of various brain networks has been confirmed with the use of brain activity pattern images obtained by fMRI (for example, NPL 2).

Activities of a brain network can directly be observed by using brain activity pattern images obtained by fMRI measurement. On the other hand, there is a problem in connection with possibility of wide spread use such as a limited location of arrangement of a large-sized apparatus necessary for fMRI measurement and necessity for a subject to remain in a measurement apparatus.

An approach to estimation of current activities of a brain network with the use of fMRI measurement data and EEG measurement data has then been proposed (for example, PTL 1). PTL 1 discloses a neurofeedback system which uses data of simultaneous fMRI and EEG measurement.

CITATION LIST

Patent Literature

PTL 1: US Patent Publication No. 2014/0148657

Non Patent Literature

NPL 1: Jun-ichiro Hirayama, Aapo Hyvarinen, Motoaki Kawanabe, "SPLICE: Fully Tractable Hierarchical Extension of ICA with Pooling," Proceedings of the 34th International Conference on Machine Learning, PMLR 70:1491-1500, 2017.
NPL 2: B. T. T. Yeo, F. M. Krienen, J. Sepulcre, M. R. Sabuncu, D. Lashkari, M. Hollinshead, J. L. Roffman, J. W. Smoller, L. Zollei, J. R. Polimeni, et al., "The organization of the human cerebral cortex estimated by functional connectivity," J. Neurophysiol., 106 (2011), pp. 1125-1165

SUMMARY OF INVENTION

Technical Problem

In the prior art as described above, in order to obtain information for estimating brain network activities, inverse problem analysis of EEG measurement results is required. Such inverse problem analysis is disadvantageous in poor utility because it requires information on a shape of a brain or a skull or information on a position of a sensor in order to obtain highly accurate results, and disadvantageous in its large amount of operational processing which leads to inevitably large temporal granularity of calculated brain network activities. According to the prior art, activities of only some specific brain networks among a plurality of brain networks can be estimated.

An approach which allows relatively quick estimation of activities of various brain networks with the use of signals of brain waves measured by a relatively simplified method such as EEG measurement has been demanded.

Solution to Problem

A brain network activity estimation system according to one embodiment of the present invention includes obtaining means for obtaining brain wave measurement data and functional magnetic resonance imaging measurement data simultaneously measured from a subject and parameter determination means for constructing a feature estimation model which receives the brain wave measurement data as input data and determining a parameter which defines the feature estimation model. The feature estimation model includes a plurality of elements representing signal sources in a brain and a plurality of modules each correlated with at least one of the plurality of elements. The brain network activity estimation system further includes first feature value calculation means for calculating a feature value for each module based on an output value from each module that is calculated when the brain wave measurement data is provided as the input data, second feature value calculation means for calculating an image feature value for each brain network based on the functional magnetic resonance imaging measurement data, and determination means for determining one or more modules which express activities of a specific brain network among the plurality of modules by evaluating correlation between the feature value for each module calculated by the first feature value calculation means and the image feature value for each brain network calculated by the second feature value calculation means.

In the embodiment, the brain network activity estimation system may further include third feature value calculation means for providing the brain wave measurement data measured from the subject to the feature estimation model as the input data and calculating a feature value of the one or more modules which express the activities of at least the specific brain network and brain activity calculation means for calculating a value representing intensity of the activities of the specific brain network based on the feature value calculated by the third feature value calculation means.

In the embodiment, the brain network activity estimation system may further include feedback means for determining contents of an action onto the subject based on the value representing the intensity of the activities of the specific brain network.

In the embodiment, each of the plurality of elements may be calculated as linear combination of the input data.

In the embodiment, the input data may be chronological data over a prescribed period, and the first feature value calculation means may consolidate the chronological data of feature values of each module over the prescribed period in a time direction and output the chronological data as the feature value for each module.

In the embodiment, the parameter determination means may estimate the parameter which defines the feature estimation model such that strong correlation is produced between time waveforms (short-time power or amplitude) of the elements calculated when the brain wave measurement data is provided as the input data.

In the embodiment, the brain network activity estimation system may further include storage means for storing for each subject, the parameter which defines the feature estimation model and information representing the one or more modules which express the activities of the specific brain network in association with each other and outputting, in response to a request, a parameter corresponding to a specific subject and the information representing the one or more modules which express the activities of the specific brain network.

A method of estimating activities of a brain network according to another embodiment of the present invention includes obtaining brain wave measurement data and functional magnetic resonance imaging measurement data simultaneously measured from a subject and constructing a feature estimation model which receives the brain wave measurement data as input data and determining a parameter which defines the feature estimation model. The feature estimation model includes a plurality of elements representing signal sources in a brain and a plurality of modules each correlated with at least one of the plurality of elements. The method of estimating activities of a brain network includes calculating a feature value for each module based on an output value from each module that is calculated when the brain wave measurement data is provided as the input data, calculating an image feature value for each brain network based on the functional magnetic resonance imaging measurement data, and determining one or more modules which express activities of a specific brain network among the plurality of modules by evaluating correlation between the calculated feature value for each module and the calculated image feature value for each brain network.

A brain network activity estimation program according to yet another embodiment of the present invention causes a computer to perform obtaining brain wave measurement data and functional magnetic resonance imaging measurement data simultaneously measured from a subject and constructing a feature estimation model which receives the brain wave measurement data as input data and determining a parameter which defines the feature estimation model. The feature estimation model includes a plurality of elements representing signal sources in a brain and a plurality of modules each correlated with at least one of the plurality of elements. The brain network activity estimation program causes the computer to further perform calculating a feature value for each module based on an output value from each module that is calculated when the brain wave measurement data is provided as the input data, calculating an image feature value for each brain network based on the functional magnetic resonance imaging measurement data, and determining one or more modules which express activities of a specific brain network among the plurality of modules by evaluating correlation between the calculated feature value for each module and the calculated image feature value for each brain network.

A brain network activity estimation system according to still another embodiment of the present invention includes obtaining means for obtaining brain wave measurement data measured from a subject and model construction means for constructing a feature estimation model which receives the brain wave measurement data as input data, by using a parameter determined in advance in association with the subject. The feature estimation model includes a plurality of elements representing signal sources in a brain and a plurality of modules each correlated with at least one of the plurality of elements. The brain network activity estimation system includes calculation means for providing the brain wave measurement data measured by the obtaining means to the feature estimation model as input data based on association information determined in advance in association with the subject, the association information representing one or more modules which express activities of a specific brain network among the plurality of modules, and calculating a value representing intensity of the activities of the specific brain network from a feature value of the one or more modules which express the activities of the specific brain network. The parameter which defines the feature estimation model is determined to produce strong correlation between time waveforms of elements calculated when the brain wave measurement data is provided as the input data. The association information is determined by evaluating correlation between a feature value for each module calculated based on an output value from each module that is produced when the brain wave measurement data used for determination of the parameter is provided to the feature estimation model as the input data and an image feature value for each brain network calculated based on functional magnetic resonance imaging measurement data measured from the subject simultaneously with the brain wave measurement data used for determination of the parameter.

A method of estimating activities of a brain network according to still another embodiment of the present invention includes obtaining brain wave measurement data measured from a subject and constructing a feature estimation model which receives the brain wave measurement data as input data, by using a parameter determined in advance in association with the subject. The feature estimation model includes a plurality of elements representing signal sources in a brain and a plurality of modules each correlated with at least one of the plurality of elements. The method of estimating activities of a brain network includes providing the obtained brain wave measurement data to the feature estimation model as input data based on association information determined in advance in association with the subject, the association information identifying one or more modules which express activities of a specific brain network among the plurality of modules, and calculating a value representing intensity of the activities of the specific brain network from a feature value of the one or more modules which express the activities of the specific brain network. The parameter which defines the feature estimation model is determined to produce strong correlation between time waveforms of elements calculated when the brain wave measurement data is provided as the input data. The association information is determined by evaluating correlation between a feature value for each module calculated based on an output value from each module that is produced when the brain wave measurement data used for determination of the parameter is provided to the feature estimation model as the input data and an image feature value for each brain network calculated based on functional magnetic resonance imaging measurement data measured from the subject simultaneously with the brain wave measurement data used for determination of the parameter.

A brain network activity estimation program according to still another embodiment of the present invention causes a computer to perform obtaining brain wave measurement data measured from a subject and constructing a feature estimation model which receives the brain wave measurement data as input data, by using a parameter determined in advance in association with the subject. The feature estimation model includes a plurality of elements representing signal sources in a brain and a plurality of modules each correlated with at least one of the plurality of elements. The brain network activity estimation program causes the computer to perform providing the obtained brain wave measurement data to the feature estimation model as input data based on association information determined in advance in association with the subject, the association information identifying one or more modules which express activities of a specific brain network among the plurality of modules, and calculating a value representing intensity of the activities of the specific brain network from a feature value of the one or more modules which express the activities of the specific brain network. The parameter which defines the feature estimation model is determined to produce strong correlation between time waveforms of elements calculated when the brain wave measurement data is provided as the input data. The association information is determined by evaluating correlation between a feature value for each module calculated based on an output value from each module that is produced when the brain wave measurement data used for determination of the parameter is provided to the feature estimation model as the input data and an image feature value for each brain network calculated based on functional magnetic resonance imaging measurement data measured from the subject simultaneously with the brain wave measurement data used for determination of the parameter.

According to still another embodiment of the present invention, a trained brain activity estimation model which outputs a value representing intensity of activities of a specific brain network of a subject by receiving input of brain wave measurement data measured from the subject is provided. The trained brain activity estimation model includes a feature estimation model which receives the brain wave measurement data as input data and association information. The feature estimation model includes a plurality of elements representing signal sources in a brain and a plurality of modules each correlated with at least one of the plurality of elements. Each of the plurality of elements is defined as linear combination of values corresponding to dimensions of the brain wave measurement data. The association information includes a parameter which is determined in advance in association with the subject and identifies one or more modules which express the activities of the specific brain network among the plurality of modules. In a training process for constructing the trained brain activity estimation model, the trained brain activity estimation model causes a computer to perform obtaining brain wave measurement data and functional magnetic resonance imaging measurement data simultaneously measured from the subject, determining a parameter which defines the feature estimation model to produce strong correlation between time waveforms of elements calculated when the brain wave measurement data is provided to the feature estimation model as input data, calculating a feature value for each module based on an output value from each module that is calculated when the brain wave measurement data is provided as the input data to the feature estimation model constructed in accordance with the determined parameter, calculating an image feature value for each brain network based on the functional magnetic resonance imaging measurement data, and determining the association information by evaluating correlation between the calculated feature value for each module and the calculated image feature value for each brain network.

Advantageous Effects of Invention

According to one embodiment of the present invention, activities of various brain networks can relatively quickly be estimated by using signals of brain waves measured by a relatively simplified method such as EEG measurement.

DESCRIPTION OF EMBODIMENTS

Figure 1:
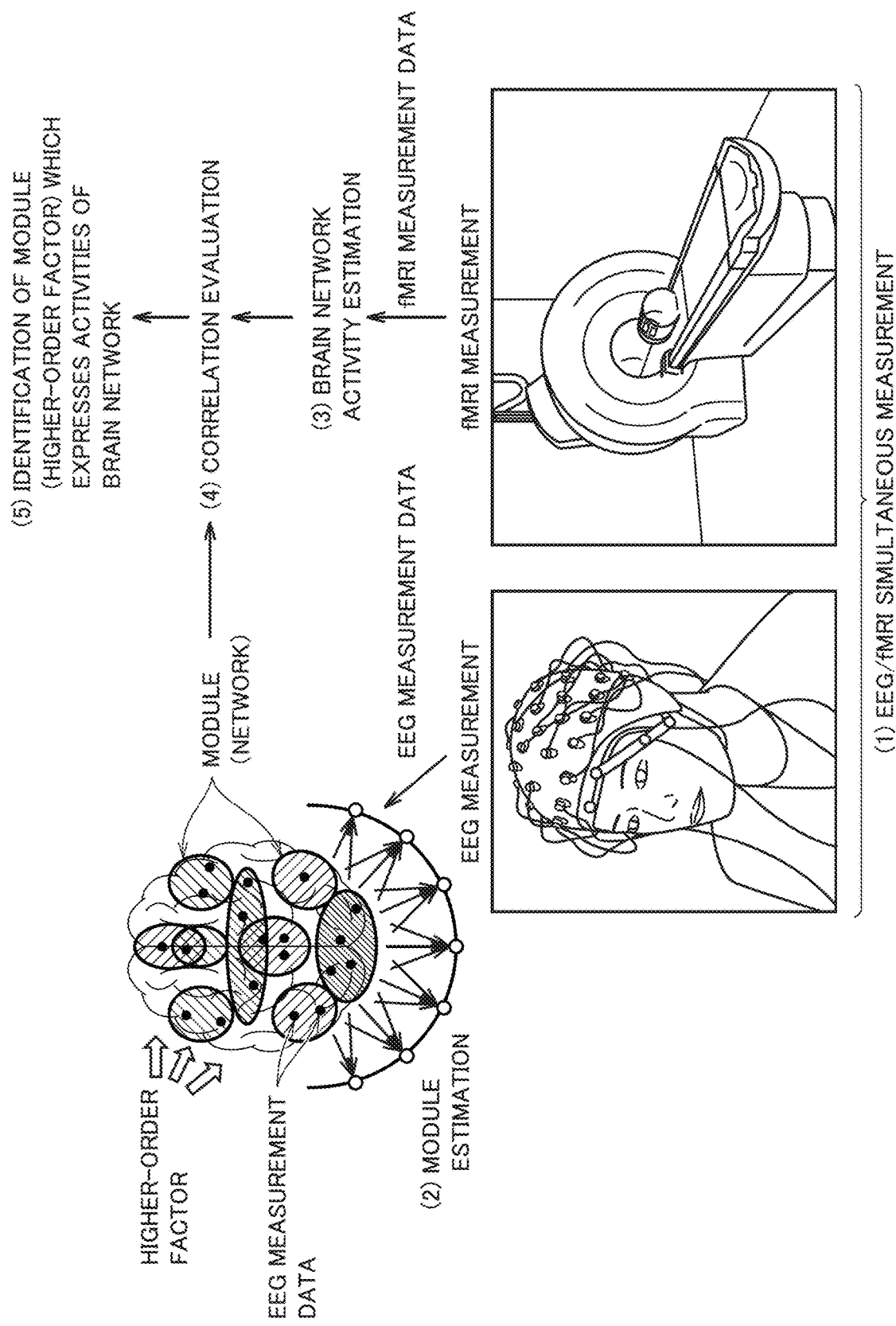
FIG. 1 is a schematic diagram showing overview of a method of estimating activities of a brain network according to the present embodiment.

An embodiment of the present invention will be described in detail with reference to the drawings. The same or corresponding elements in the drawings have the same reference characters allotted and description thereof will not be repeated.

[A. Overview]

Overview of a method of estimating activities of a brain network according to the present embodiment will initially be described. FIG. 1 is a schematic diagram showing overview of a method of estimating activities of a brain network according to the present embodiment.

Referring to FIG. 1, in the method of estimating activities of a brain network in the present embodiment, initially, brain waves and functional magnetic resonance imaging (which will also be abbreviated as "fMRI" below) of the same subject are simultaneously measured ((1) EEG/fMRI simultaneous measurement). Data measured with EEG measurement (which will also be referred to as "EEG measurement data" below) and data measured with fMRI measurement (which will also be referred to as "fMRI measurement data" below) represent the same brain activities of the same subject.

EEG measurement data in the present embodiment refers to a set of signals measured with each sensor arranged on a head of a subject and reflects brain activities in the vicinity of a position where each sensor is arranged. Each sensor is also referred to as a channel and EEG measurement data corresponds to multichannel brain wave data. Each sensor is typically constituted of a pair of electrodes.

In succession, a module (a network) is estimated from EEG measurement data ((2) module estimation). Information included in a module includes a feature value representing activities of a set of sources of strongly correlating signals set in the brain of the subject. The feature value estimated by modularization can express a brain network. As will be described later, the estimated feature value is non-linear.

Each module is estimated as being affected by a plurality of channels of EEG measurement data. Basically, each module is more strongly affected by EEG measurement data obtained from a sensor in the vicinity of a corresponding signal source in the brain.

One or more higher-order factors relevant to one or more modules are also estimated. The higher-order factor reflects activities of a set of modules.

Activities of a brain network are estimated from fMRI measurement data ((3) brain network activity estimation).

The brain network is also referred to as a resting state network, which is collective denotation of characteristic brain activity patterns resulting from a signal source belonging to a single brain region or from coordination of signal sources belonging to a plurality of spatially distant brain regions. The brain network is defined mainly by using resting-state fMRI. Representative examples include a default mode network (DMN) and a dorsal attention network. For example, when some function is requested, not only a signal source alone belonging to a specific brain region is activated but also signal sources belonging to a plurality of brain regions may be activated in coordination. A pattern which exhibits activities of signal source(s) belonging to one or more brain regions depending on each function is referred to as a brain network. With attention being paid to a single brain region, it may often simply be referred to as a (functional) region of interest. The "brain network" herein, however, is a concept encompassing both of an example in which attention is paid to a single brain region and an example in which attention is paid to a plurality of spatially distant brain regions.

Each brain network is located in an identical layer where a module associated with one or more signal sources is located.

As described above, since EEG measurement data and fMRI measurement data represent measurement results simultaneously obtained from the same subject, they should reflect the same brain network. Relevance between an estimated module and/or higher-order factor and an estimated brain network is evaluated by using such advance knowledge ((4) correlation evaluation). Then, a higher-order factor and a module relatively strongly correlating with an estimated brain network of one or more modules associated with the higher-order factor are determined as candidates which express activities of the brain network ((5) identification of module which expresses brain network activity).

Through a processing procedure as above, a module and/or a higher-order factor which express(es) activities of a brain network can be determined. For the sake of convenience of description, though processing for estimating a module which expresses activities of a brain network will mainly be described in the description below, not only a module but also a higher-order factor which expresses activities of a brain network may be estimated.

In the method of estimating activities of a brain network according to the present embodiment, not only EEG representing a value of measurement of a voltage generated by electrical activities of a brain but also magnetoencephalography (MEG) representing a value of measurement of time-varying magnetic field generated by electrical activities of the brain can be used.

As described above, "brain waves" herein is a term for collectively denoting variation in signal (time waveforms) measured in EEG measurement and MEG measurement. For the sake of convenience of description, an example in which EEG measurement data is used will mainly be described in the description below.

[B. Overview of Activity Estimation System]

Overview of the activity estimation system for performing the method of estimating activities of a brain network according to the present embodiment will now be described.

Figure 2:
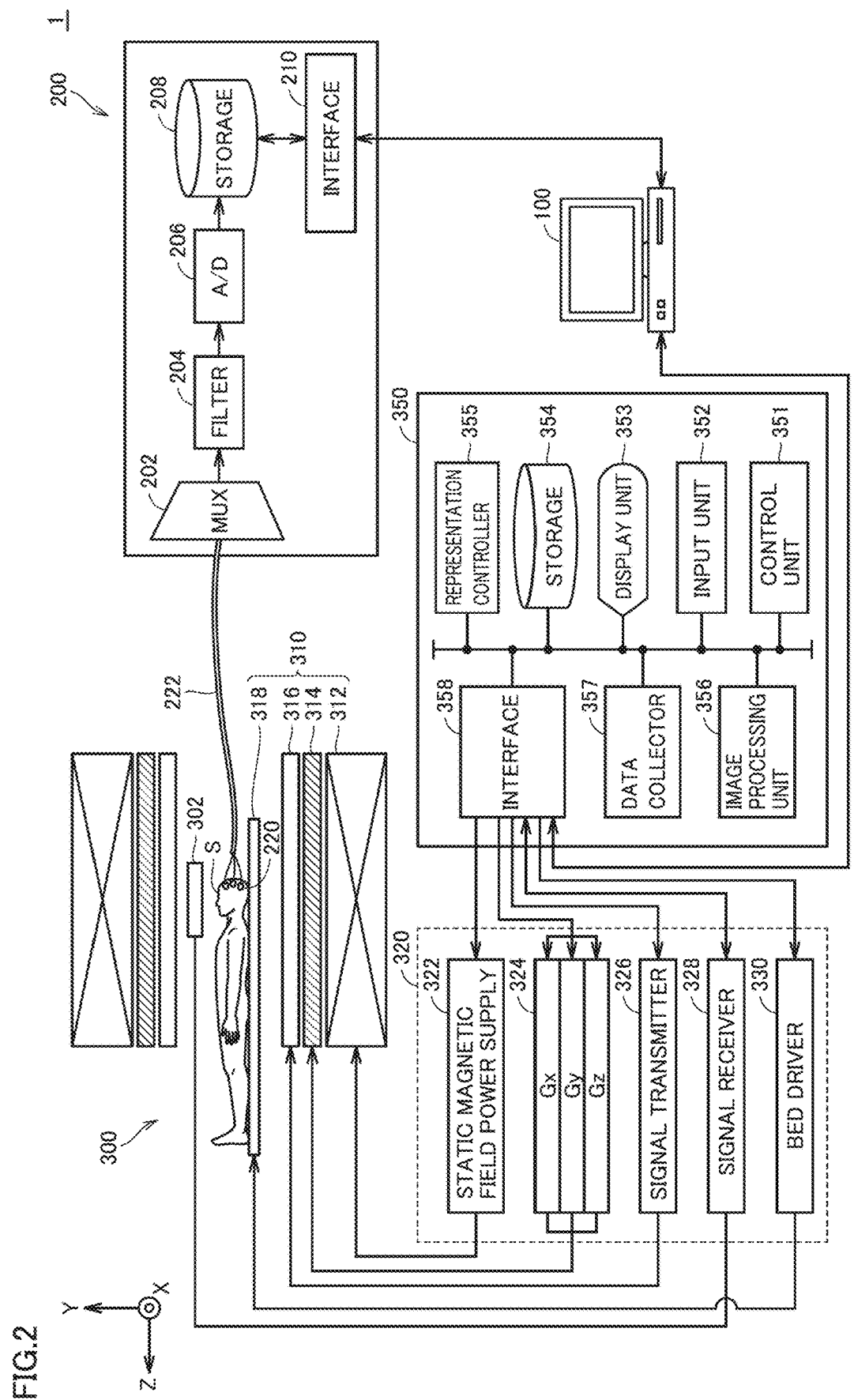
FIG. 2 is a schematic diagram showing overview of a brain network activity estimation system according to the present embodiment.

FIG. 2 is a schematic diagram showing overview of a brain network activity estimation system 1 according to the present embodiment. Referring to FIG. 2, activity estimation system 1 includes a processing apparatus 100, an EEG measurement apparatus 200, and an fMRI measurement apparatus 300.

As will be described later, processing apparatus 100 accepts EEG measurement data measured with EEG measurement apparatus 200 and fMRI measurement data measured with fMRI measurement apparatus 300 and outputs association information which identifies one or more modules which express activities of a specific brain network. Processing apparatus 100 thus obtains measurement data of brain waves (EEG measurement data) and measurement data of functional magnetic resonance imaging (fMRI measurement data) simultaneously measured from a subject.

EEG measurement apparatus 200 detects a signal (an electrical signal) representing brain waves generated in a plurality of sensors 220 arranged on the head of a subject S. EEG measurement apparatus 200 includes a multiplexer 202, a noise filter 204, an analog to digital (A/D) converter 206, a storage 208, and an interface 210.

Multiplexer 202 sequentially selects one set of cables from among cables 222 connected to the plurality of sensors 220 and electrically connects the set of cables to noise filter 204. Noise filter 204 is a filter which removes noise, such as a high-frequency cut filter, and removes noise components contained in a signal (an electrical signal) representing brain waves generated in the set of cables corresponding to a selected channel.

A/D converter 206 samples an electrical signal (an analog signal) output from noise filter 204 every prescribed cycle and outputs the signal as a digital signal. Storage 208 successively stores chronological data (digital signals) output from A/D converter 206 in association with information representing a selected channel and timing (for example, time or a counter value).

Interface 210 outputs chronological data representing brain waves that is stored in storage 208 to processing apparatus 100 in response to an access from processing apparatus 100 or the like.

fMRI measurement apparatus 300 measures brain activities by detecting electromagnetic waves generated by resonance from a specific nucleus (for example, a hydrogen nucleus) by applying high-frequency electromagnetic field at a resonant frequency to a region from which information on brain activities of subject S is to be obtained (which will also be referred to as a "region of interest" below).

fMRI measurement apparatus 300 includes a magnetic field application mechanism 310, a reception coil 302, a driver 320, and a data processing unit 350.

Magnetic field application mechanism 310 applies controlled magnetic field (static magnetic field and gradient magnetic field) to a region of interest of subject S and emits radio frequency (RF) pulses thereto. More specifically, magnetic field application mechanism 310 includes a static magnetic field generation coil 312, a gradient magnetic field generation coil 314, an RF emitter 316, and a bed 318 including a bore in which subject S lies.

Driver 320 is connected to magnetic field application mechanism 310, and controls magnetic field applied to subject S and transmission and reception of RF pulse waves. More specifically, driver 320 includes a static magnetic field power supply 322, a gradient magnetic field power supply 324, a signal transmitter 326, a signal receiver 328, and a bed driver 330.

In FIG. 2, a central axis of a cylindrical bore in which subject S lies is defined as a Z axis and a horizontal direction and a vertical direction orthogonal to the Z axis are defined as an X axis and a Y axis, respectively.

Static magnetic field generation coil 312 generates static magnetic field in a Z-axis direction in the bore from a helical coil wound around the Z axis. Gradient magnetic field generation coil 314 includes an X coil, a Y coil, and a Z coil (none of which are shown) which generate gradient magnetic field in an X-axis direction, a Y-axis direction, and the Z-axis direction in the bore. RF emitter 316 emits RF pulses to a region of interest in subject S based on a high-frequency signal transmitted from signal transmitter 326 in accordance with a control sequence. Though FIG. 2 shows an exemplary configuration in which RF emitter 316 is contained in magnetic field application mechanism 310, RF emitter 316 may be provided on a side of bed 318, or RF emitter 316 and reception coil 302 may be integrated with each other.

Reception coil 302 receives electromagnetic waves (NMR signals) emitted from subject S and outputs an analog signal. The analog signal output from reception coil 302 is subjected to amplification and A/D conversion in signal receiver 328 and then output to data processing unit 350. Reception coil 302 is preferably arranged in proximity to subject S such that an NMR signal can be detected at high sensitivity.

Data processing unit 350 sets a control sequence for driver 320 and outputs a plurality of brain activity pattern images representing an activation factor of the brain as information representing brain activities, based on the NMR signal received by reception coil 302.

Data processing unit 350 includes a control unit 351, an input unit 352, a display unit 353, a storage 354, a representation controller 355, an image processing unit 356, a data collector 357, and an interface 358. Data processing unit 350 may be implemented by a dedicated computer or a general-purpose computer which performs prescribed processing by executing a control program stored in storage 354 or the like.

Control unit 351 controls an operation by each functional unit, such as generation of a control sequence for driving driver 320. Input unit 352 accepts various operations or information input from a not-shown operator. Display unit 353 has various images and various types of information relating to a region of interest in subject S shown on a screen. Storage 354 stores a control program for performing processing involved with fMRI measurement, a parameter, image data (a three-dimensional model image or the like), and other electronic data. Image processing unit 356 generates a plurality of brain activity pattern images based on data of a detected NMR signal. Interface 358 exchanges various signals with driver 320. Data collector 357 collects data constituted of a set of NMR signals derived from a region of interest.

Figure 3:
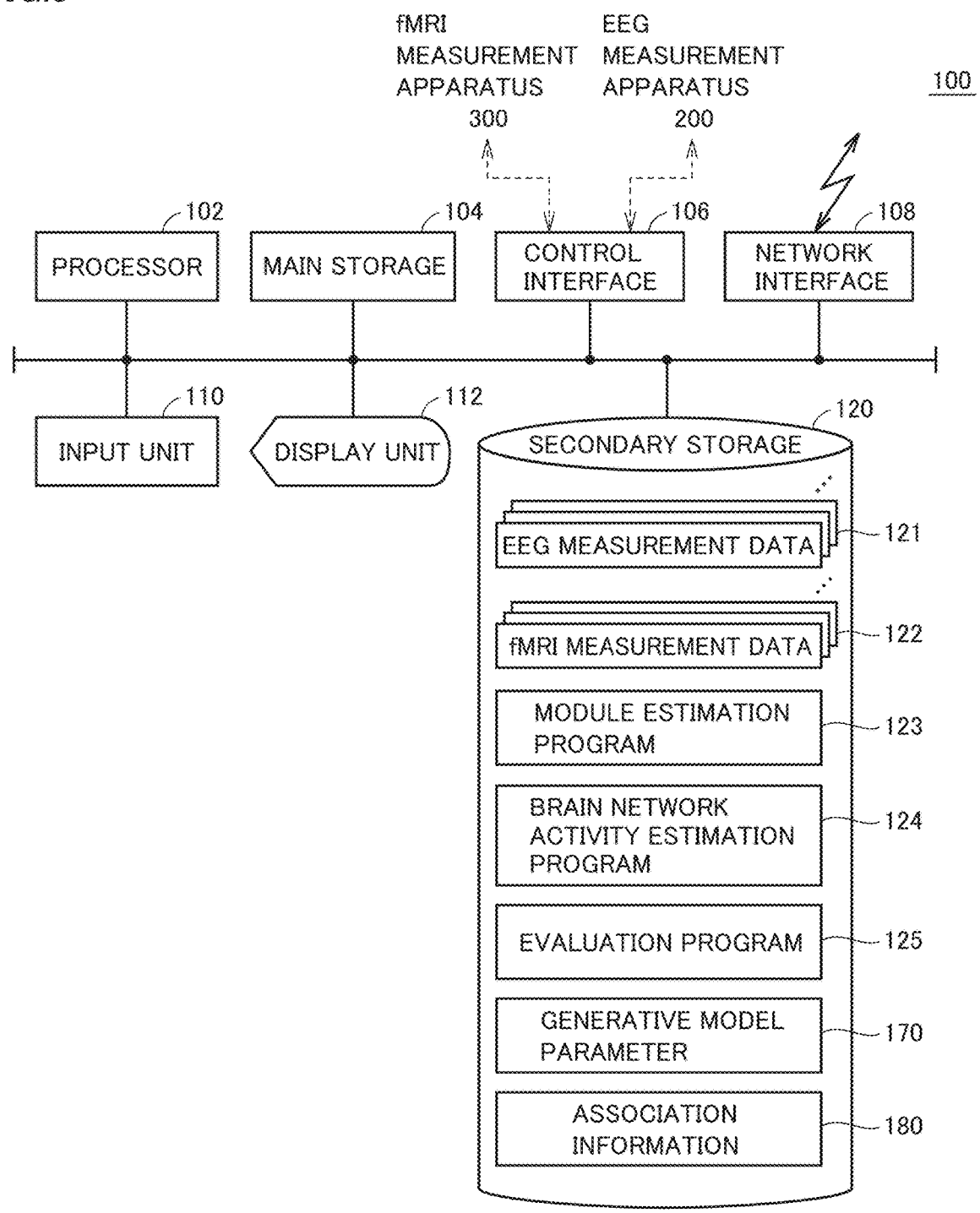
FIG. 3 is a schematic diagram showing a configuration of a processing apparatus included in the activity estimation system according to the present embodiment.

FIG. 3 is a schematic diagram showing a configuration of processing apparatus 100 included in activity estimation system 1 according to the present embodiment. A computer in accordance with a general-purpose architecture can typically be adopted as processing apparatus 100. Referring to FIG. 3, processing apparatus 100 includes as its main components, a processor 102, a main storage 104, a control interface 106, a network interface 108, an input unit 110, a display unit 112, and a secondary storage 120.

Processor 102 is implemented by an operation processing circuit such as a central processing unit (CPU) or a graphical processing unit (GPU), and performs various functions which will be described later by executing codes included in various programs stored in secondary storage 120 in a designated order. Main storage 104 is implemented by a dynamic random access memory (DRAM) or the like and holds a code of a program executed by processor 102 or various types of work data necessary for execution of a program.

Processing apparatus 100 has a communication function, which is provided mainly by control interface 106 and network interface 108.

Control interface 106 exchanges data with data processing unit 350 of fMRI measurement apparatus 300. Network interface 108 exchanges data with an external apparatus (for example, a data server apparatus on the cloud). Control interface 106 and network interface 108 are implemented by any communication component such as a wired local area network (LAN), a wireless LAN, a universal serial bus (USB), or Bluetooth®.

Input unit 110 is typically implemented by a mouse, a keyboard, or the like and accepts an operation by a user. Display unit 112 is typically implemented by a display and notifies a user of various types of information involved with a state of processing performed in processing apparatus 100 or an operation.

Secondary storage 120 is typically implemented by a hard disk or a solid state drive (SSD) and holds various programs executed by processor 102, various types of data necessary for processing, and a set value. More specifically, secondary storage 120 stores EEG measurement data 121, fMRI measurement data 122, a module estimation program 123, a brain network activity estimation program 124, an evaluation program 125, a generative model parameter 170, and association information 180.

[C. EEG/fMRI Simultaneous Measurement]

"(1) EEG/fMRI simultaneous measurement" shown in FIG. 1 will initially be described. With activity estimation system 1 shown FIG. 2, subject S with a sensor being attached to the head is laid in a bore of fMRI measurement apparatus 300, and EEG measurement and fMRI measurement are performed in parallel.

Processing apparatus 100 stores measurement data from EEG measurement apparatus 200 and fMRI measurement apparatus 300 in correspondence with each other, with common time being defined as the reference. EEG measurement data and fMRI measurement data common in time axis can be obtained based on correspondence of measurement data based on such common time. By using these two types of measurement data, correlation therebetween is evaluated.

[D. Module Estimation]

"(2) Module estimation" shown in FIG. 1 will now be described. Though overview of module estimation processing will be described below, reference is to be made to "Jun-ichiro Hirayama, Aapo Hyvarinen, Motoaki Kawanabe, 'SPLICE: Fully Tractable Hierarchical Extension of ICA with Pooling,' Proceedings of the 34th International Conference on Machine Learning, PMLR 70:1491-1500, 2017." (NPL 1) for a more detailed processing procedure.

(d1: Description of Principles)

Figure 4:
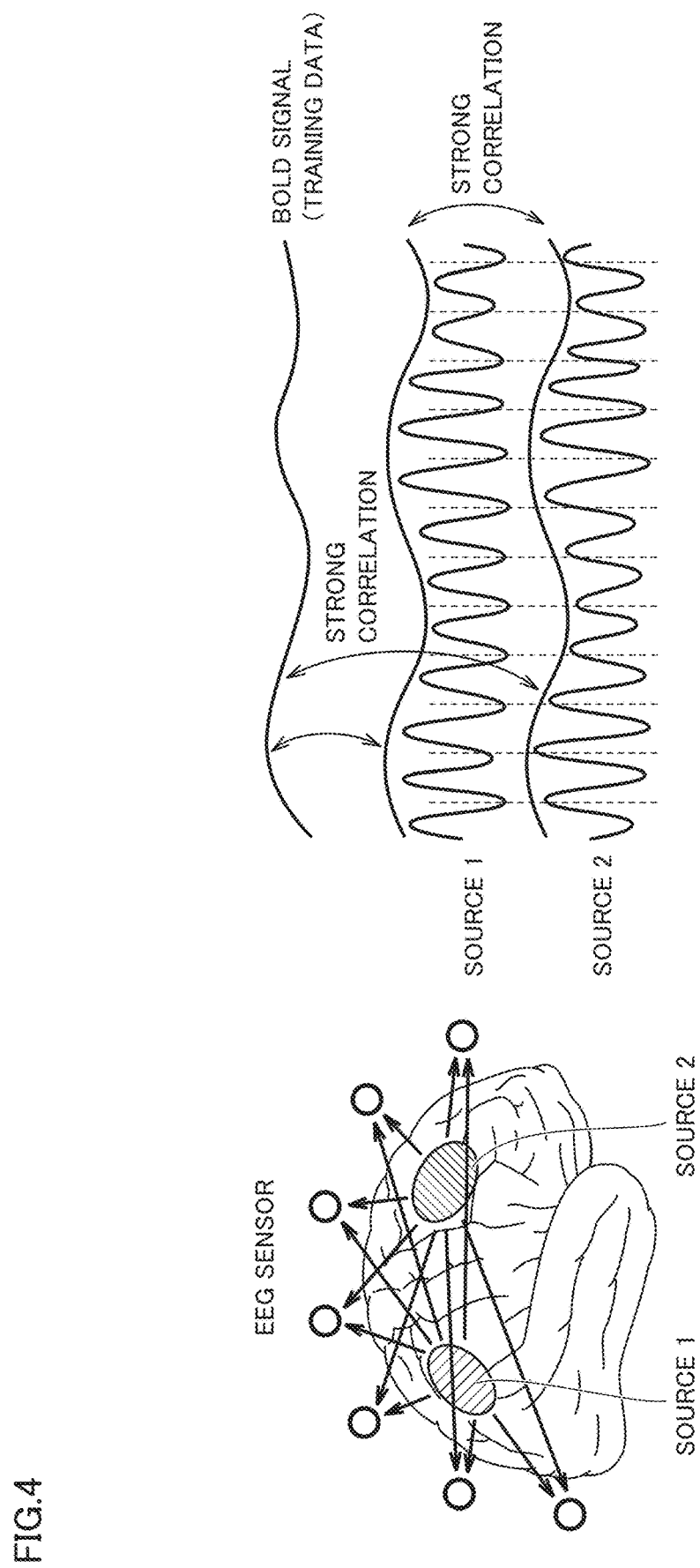
FIG. 4 is a schematic diagram for illustrating principles in estimating a module in the activity estimation system according to the present embodiment.
Figure 5:
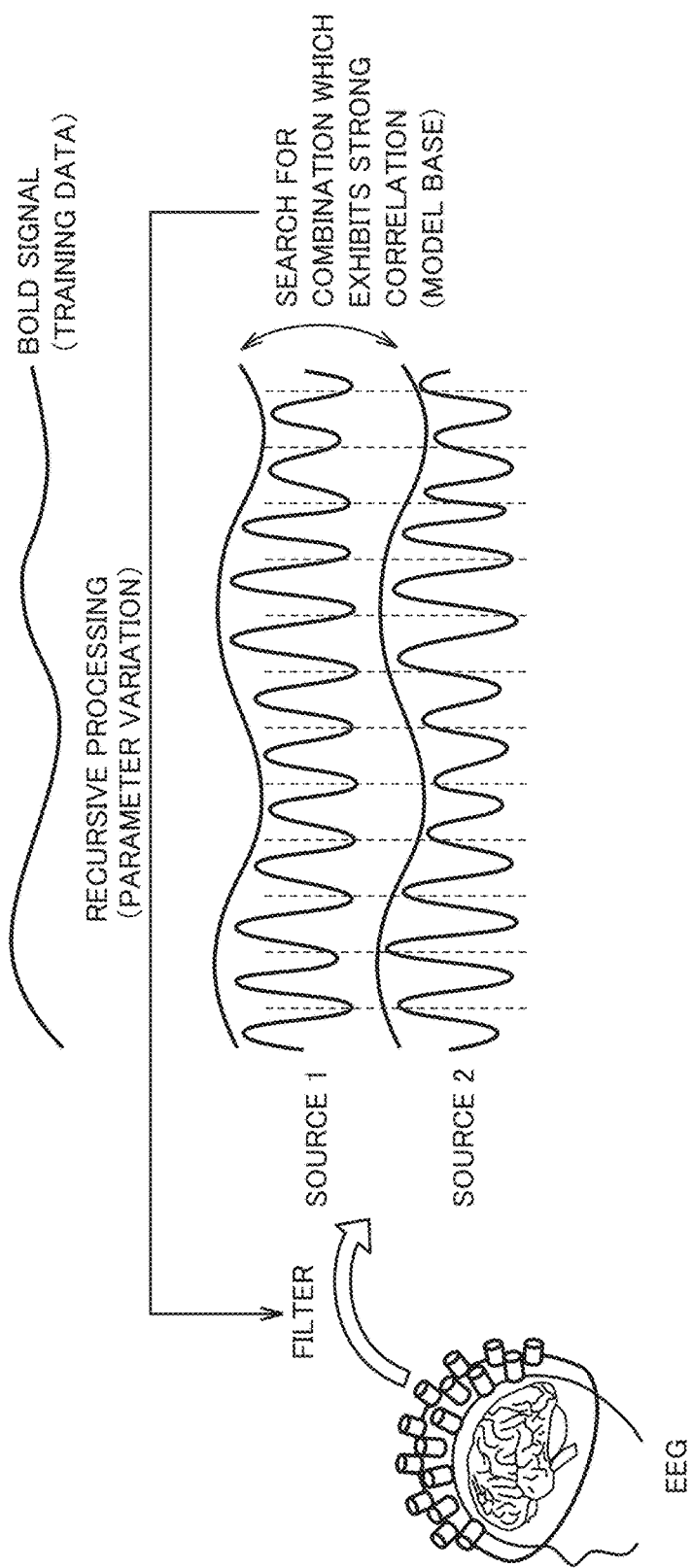
FIG. 5 is a schematic diagram for illustrating a procedure in determining a parameter under a hypothesis shown in FIG. 4.

Principles in module estimation in activity estimation system 1 according to the present embodiment will initially be described. FIG. 4 is a schematic diagram for illustrating principles in estimating a module in activity estimation system 1 according to the present embodiment. FIG. 5 is a schematic diagram for illustrating a procedure in determining a parameter under a hypothesis shown in FIG. 4.

Referring to FIG. 4, it is assumed that there are a plurality of signal sources (which are also simply referred to as "sources" below) in the brain that are activated in response to brain activities. A time waveform of each channel of EEG measurement data is found as combination of time waveforms from a plurality of assumed sources. The plurality of assumed sources are assumed as elements which determine time waveforms of each channel of measured EEG measurement data that is obtained.

Turning to an appropriate frequency band, it has been reported that short-time power (and an envelope) of a time signal from such a source strongly correlates with short-time power (and an envelope) of a time signal dependent on a blood oxygen level (which is also referred to as a "BOLD signal" below). Short-time power (and the envelope) of a time signal of a source represents a source activity factor representing intensity of activities of the source. An amplitude of a time signal of a source can also be used as such a source activity factor.

Based on the definition, BOLD signals strongly correlate with each other in an identical network. Therefore, when strong correlation between a BOLD signal and a time signal of each source activity factor is assumed, it can be assumed that time signals of source activity factors belonging to the identical network also strongly correlate with each other.

As shown in FIG. 5, a space filter which calculates a time waveform of each source from EEG measurement data of a plurality of channels is introduced. The introduced space filter defines a mapping matrix which brings EEG measurement data and a time waveform of each source in correspondence with each other. In the present embodiment, by way of example, relation between EEG measurement data and a time waveform of each source is defined as linear combination.

Under the hypothesis as described above, a generative model (FIG. 1) which expresses a probability distribution of EEG measurement data of a plurality of channels is adopted, and combination which achieves high correlation between time waveforms of calculated source activity factors is searched for by recursively varying parameters included in the generative model. Details of such a generative model will be described later.

The space filter shown in FIG. 5 is actually defined as each row of an inverse matrix of a parameter matrix included in a generative model and each source activity factor is calculated by using the space filter. Combination of sources which exhibits high correlation is referred to as a "module", and a model which calculates a feature value which can express an activity factor of a source and a network from EEG measurement data by using the space filter and the module is referred to as a "feature estimation model 10." Feature estimation model 10 may also calculate a feature value which expresses an activity factor of a higher-order factor.

More specifically, when activity estimation system 1 receives brain wave measurement data (EEG measurement data) as input data, it estimates a parameter which defines a generative model so as to well reproduce a probability distribution thereof. Since the generative model assumes strong correlation between time signals of the source activity factors, such estimation is the same in meaning as determination of a parameter for producing strong correlation between time waveforms of calculated elements.

Since a parameter of feature estimation model 10 is common to a parameter of the generative model, a parameter which defines feature estimation model 10 can be determined or estimated by such processing for estimating a parameter of the generative model. Thus, activity estimation system 1 has a parameter determination function to construct feature estimation model 10 which receives brain wave measurement data (EEG measurement data) as input data and to determine a parameter which defines feature estimation model 10.

According to the method of estimating a parameter according to the present embodiment, without a BOLD signal representing essential teaching data, feature estimation model 10 which defines relation between EEG measurement data and a source and a module can be determined by applying recursive processing with a plurality of sources being assumed.

(d2: Feature Estimation Model 10)

Figure 6:
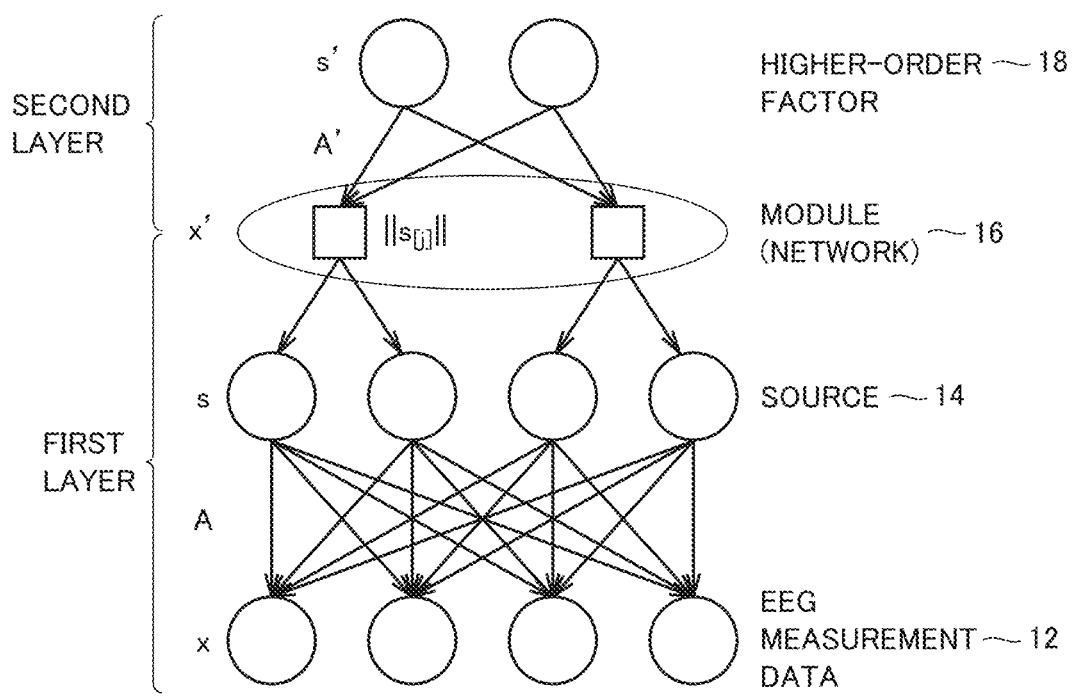
FIG. 6 is a schematic diagram showing one example of a feature estimation model which receives EEG measurement data as input, the model being used in the activity estimation system according to the present embodiment.

Feature estimation model 10 used in activity estimation system 1 according to the present embodiment will now be described. FIG. 6 is a schematic diagram showing one example of feature estimation model 10 which receives EEG measurement data as input, feature estimation model 10 being used in activity estimation system 1 according to the present embodiment. FIG. 6 shows one example of a minimal configuration of feature estimation model 10.

Referring to FIG. 6, in the present embodiment, feature estimation model 10 constituted of a first layer and a second layer is envisioned. It is assumed that there are sources 14 as many as channels of EEG measurement data 12 in the first layer. Feature values of a plurality of modules 16 are output from the first layer.

Preprocessed EEG measurement data 12 which is provided as input to feature estimation model 10 is collectively referred to as n input vectors $x_t$ (t=1, 2, ..., n). Each input vector $x_t$ stores an element $x_{it}$ of a vector d represented by either a real number or an imaginary number. The element of each input vector $x_t$ is assumed as linear combination of a source vector $s_t$. The number of source vectors $s_t$ is assumed as being the same as the number of input vectors $x_t$. Thus, feature estimation model 10 includes a plurality of elements (sources 14) representing signal sources in the brain and a plurality of modules 16 each correlated with at least one of the plurality of elements. In the second layer, there are a plurality of higher-order factors 18 correlated with the plurality of modules 16.

The plurality of sources 14 and input vectors $x_t$ may be combined in any form. With linear combination between the plurality of sources 14 and input vectors $x_t$, processing for estimating a parameter which defines feature estimation model 10 as will be described later can be simplified. Each of the plurality of elements (sources 14) may be calculated as linear combination of input data.

In module estimation according to the present embodiment, an approach similar to independent subspace analysis (ISA) is adopted. In the description below, input vector $x_t$ and source vector $s_t$ are independently and identically distributed (IID). Relation between an input vector x and a source vector s with a subscript t being abbreviated can be expressed as in an expression (1) below, by using a coefficient matrix A (that is, a mixing matrix).

$$x = As \qquad (1)$$

Coefficient matrix A is a square matrix and an invertible matrix. Therefore, a matrix $W(\equiv A^{-1})$ which is an inverse matrix of coefficient matrix A corresponds to a demixing matrix.

In the description below, it is assumed that each of averages of input vectors x and source vectors s is zero by subtracting an average value of an original data vector. Generality is not lost even though such vector of which average is zero is used.

Sources 14 in the first layer are divided into m groups which do not overlap with one another. A vector composed of $d_j$ sources in a jth group ($1 \leq j \leq m$) is expressed as a source vector $s_{[j]}$. Source vector $s_{[j]}$ represents a $d_j$-dimensional subspace in an original data space multiplied by a corresponding column of coefficient matrix A.

In feature estimation model 10 according to the present embodiment, m source vectors $s_{[j]}$ are dependent on one another in "powers" or "energies". Such "powers" or "energies" can be quantified as $\|s_{[j]}\|^2$ which is $L_2$ norm (that is, a square sum). Such dependency is modeled by using linear combination of another source in the second layer. In such a model, non-linearity in a fractal dimension is not produced. Specifically, the $L_2$ norm can be expressed as in an expression (2) below (j=1, 2, ..., m).

$$\|s_{[j]}\|^2 = F_j^{-1}([A's']_j) \qquad (2)$$

$F_j$ representing a monotonous mapping function maps a (non-negative) square sum to an actual value by using an inverse function $F_j^{-1}$. A' and s' represent an invertible coupled matrix and a source vector in the second layer, respectively. A matrix W' which is an inverse matrix of coefficient matrix A' ($\equiv A'^{-1}$) corresponds to a demixing matrix. A subscript j means a jth element of a vector.

In the second layer, a vector x' corresponding to module 16 is expressed as x'=A's'.

For the sake of convenience of description, feature estimation model 10 including the first layer and the second layer is defined by introducing a normalized vector as in an expression (3) below for all source vectors $s_{[j]}$.

$$u_{[j]} = s_{[j]} / \|s_{[j]}\| \qquad (3)$$

Normalized vector $u_{[j]}$ is assumed to evenly be distributed over a unit hyperspherical surface independently of other random variables for each j.

(d3: Determination of Parameter)

In the present embodiment, a parameter which defines feature estimation model 10 is determined by applying maximum likelihood estimation to a probability density function (PDF) for input vector x representing EEG measurement data 12.

In feature estimation model 10 according to the present embodiment, a probability density function p(x) for input vector x can be generalized as in an expression (4) below.

$$p(x) = \prod_{k=1}^{d} \exp\left(-H_k\left(\sum_j w'_{kj} F_j(\|W_{[j]} x\|^2)\right)\right) \qquad (4)$$

$$|\det W'| \times \prod_{j=1}^{d} \exp(-G_j \|W_{[j]} x\|^2) |\det W|^c$$

where $$H_k(s'_k) = -\ln p(s'_k)$$

$$G_j(q) = -\ln |f_j(q)| - \ln k_j(q)$$

$H_k$ means a fixed function corresponding to advance assumption of an arbitrarily selected non-Gaussian distribution. In the expression (4), $W_{[j]}$ means a submatrix consisting of elements in $d_j h$ column in matrix W and can be calculated as source vector $s_{[j]} = W_{[j]} x$.

In applying maximum likelihood estimation to probability density function p(x) described above, any loss function can be applied so long as it is applicable to maximization of likelihood. In the present embodiment, L=−ln p(x)+const, which is a logarithmic expression of probability density function p(x) is adopted as a loss function L.

In the present embodiment, pooling processing (that is, time averaging processing) is adopted. In adopting pooling processing, a parameter is estimated and a feature value is calculated with a predetermined period (an integer multiple of a sampling cycle) being defined as a unit of processing. In the description below, a unit resulting from division of chronological data every prescribed time period is also referred to as an "epoch".

More specifically, a loss function L(l) for feature estimation model 10 constituted of two layers according to the present embodiment can be expressed as in an expression (5) below. In the expression (5), l represents a variable which identifies an epoch. The expression (5) below is calculated by introducing a time unit of each epoch into the expression (4) described above.

$$L(\ell) = \sum_{k=1}^{m} H_k\left(\sum_j w'_{kj} F_j\left(\sum_{t \in \ell} \|W_{[j]} x_t\|^2\right)\right) - \ln|\det W'| + \sum_{j=1}^{m} G_j\left(\sum_{t \in \ell} \|W_{[j]} x_t\|^2\right) - c \ln|\det W| \quad (5)$$

By inputting T input vectors $x_1, x_2, \ldots, x_T$ into loss function L(l) for each epoch through recursive processing, a loss (l) for each epoch is calculated for all epochs. Then, a parameter (coefficient matrix A ($\equiv W^{-1}$) and coefficient matrix A' ($\equiv W'^{-1}$)) is determined to minimize a value (that is, negative logarithmic likelihood) obtained by calculating an arithmetic mean of the epochs.

Since feature estimation model 10 according to the present embodiment assumes strong correlation of a source activity factor in each of m modules, combination of sources which exhibits strong correlation as satisfying the assumption is acquired in each module as a result of maximum likelihood estimation.

Machine learning for estimating a parameter which defines feature estimation model 10 according to the present embodiment can thus be achieved by unsupervised learning.

(d4: Processing for Calculating Module Feature Value)

The entire processing for calculating a non-linear feature value which can express activities of a brain network from EEG measurement by using a parameter determined by the procedure as described above will now be described.

Figure 7:
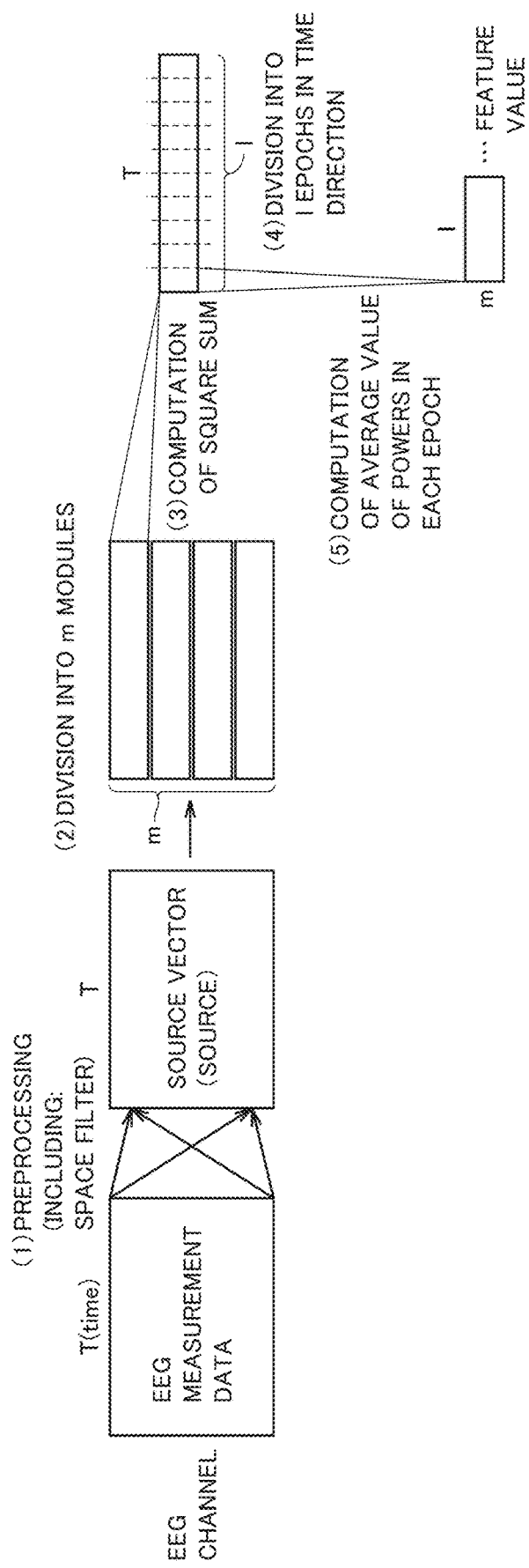
FIG. 7 is a schematic diagram for illustrating overall processing for calculating a feature value from EEG measurement data in the activity estimation system according to the present embodiment.

FIG. 7 is a schematic diagram for illustrating overall processing for calculating a feature value from EEG measurement data in activity estimation system 1 according to the present embodiment. Referring to FIG. 7, initially, a source vector is generated by performing preprocessing onto EEG measurement data obtained in EEG measurement ((1) preprocessing). Preprocessing includes standard processing such as removal of artifacts, frequency filtering, and dimensionality reduction by principal component analysis (PCA).

Input EEG measurement data (raw data) includes chronological data corresponding to the number of channels. An input vector composed of rows as many as channels and columns as many as samples in each piece of chronological data may be used as a vector expression shown in FIG. 7. From a point of view of reduction in processing load, measured raw data may be subjected to dimensionality reduction. In an evaluation example which will be described later, a 48-dimensional input vector is generated from EEG measurement data of 63 channels.

Input data composed of pieces of chronological data over a prescribed period as many as or smaller in number than channels is thus provided to feature estimation model 10. A linear space filter is applied to the input data obtained through such standard processing. The space filter calculates each element of a source vector by adding each element of the input data as being weighted.

Preprocessing may thus be performed by using a linear space filter including principal component analysis (PCA) for dimensionality reduction.

In the present embodiment, mapping from an input vector to a source vector is assumed as linear combination, and the input vector and the source vector are equal to each other in number of rows and columns. Without being limited as such, a size of a matrix may be different between the input vector and the source vector.

In succession, a source vector is divided into m modules (networks) ((2) division into m modules). In processing for generating m modules from EEG measurement data representing input data, a parameter determined in accordance with the processing procedure as described above (coefficient matrix A ($\equiv W^{-1}$)) is used.

A square sum for one or more elements corresponding to each time is calculated for each of m modules ((3) computation of square sum). Each calculated square sum corresponds to powers of each module in each sampling section.

Consequently, a square sum vector having a square sum for each module as an element of each time is calculated. Namely, a vector of m rows×T columns including a square sum as the element is generated.

A generated vector of the square sum is divided into 1 epochs in a time direction ((4) division into 1 epochs in time direction). In succession, a result (an average value) obtained by pooling processing (that is, time averaging processing) of a square sum (powers) in each epoch is output as a feature value (powers or an activity factor) of each module in a time section corresponding to each epoch ((5) computation of average value of powers in each epoch). Namely, an average value of powers for each epoch obtained by division of time T into 1 equal parts is calculated. Consequently, a vector of m rows×1 columns including an average value of powers of each epoch as an element is generated as a feature value. A result of conversion of an element included in a vector of m rows×1 columns into a logarithm may be output as a feature value.

Chronological data of feature values of each module over a prescribed period is thus consolidated in a time direction and output as a feature value for each module.

Through a series of processes shown in FIG. 7, a feature value is calculated for each time period corresponding to each epoch included in EEG measurement data provided as input data. Such a series of processes for calculating a feature value is repeated for a length of EEG measurement data (recursively performed). A feature value calculated in the processing procedure as above corresponds to a feature value of each module shown in FIG. 4. A feature value of each module is used in a procedure below.

Thus, activity estimation system 1 has a feature value calculation function to calculate a feature value for each module based on an output value from each module that is calculated when brain wave measurement data (EEG measurement data) is provided as input data.

[E. Brain Network Activity Estimation]

"(3) Brain network activity estimation" shown in FIG. 1 will now be described.

Figure 8:
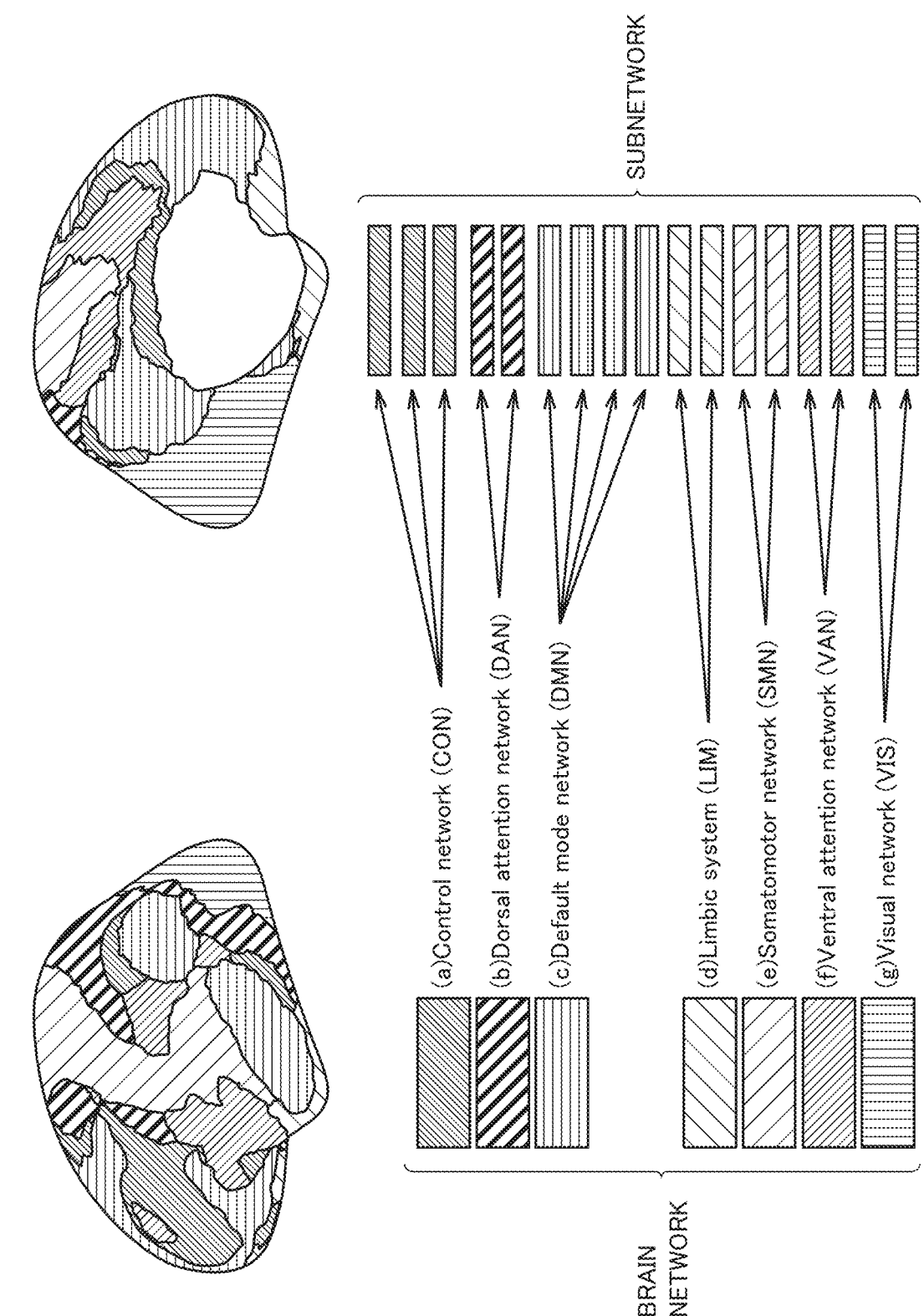
FIG. 8 is a schematic diagram showing exemplary categorization of known brain networks.

FIG. 8 is a schematic diagram showing exemplary categorization of known brain networks. Exemplary categorization shown in FIG. 8 is in conformity with contents described in "B. T. T. Yeo, F. M. Krienen, J. Sepulcre, M. R. Sabuncu, D. Lashkari, M. Hollinshead, J. L. Roffman, J. W. Smoller, L. Zollei, J. R. Polimeni, et al., 'The organization of the human cerebral cortex estimated by functional connectivity,' J. Neurophysiol., 106 (2011), pp. 1125-1165" (NPL 2).

Referring to FIG. 8, seven types of network estimation as below have been known as exemplary categorization of a functional region of interest (ROI) (that is, a brain network) of fMRI.

Specifically, a resting state network (RSN) includes seven types of (a) a control network (CON), (b) a dorsal attention network (DAN), (c) a default mode network (DMN), (d) a limbic system (LIM), (e) a somatomotor network (SMN), (f) a ventral attention network (VAN), and (g) a visual network (VIS).

The (a) control network (CON) may also be referred to as a frontal parietal network and the (f) ventral attention network (VAN) may also be referred to as a saliency network.

Seven RSNs shown in FIG. 8 are further divided into some subnetworks. The (a) control network (CON) is divided into three subnetworks, the (c) default mode network (DMN) is divided into four subnetworks, and each of other networks is divided into two subnetworks. Consequently, seventeen subnetworks in total are set as functional regions of interest of fMRI.

A feature value corresponding to each of the seventeen ROIs as described above is used for each piece of fMRI measurement data (that is, a brain activity pattern image). Thus, in the present embodiment, an image feature value is output as information representing activities of a brain network for each of the seventeen ROIs set for an output brain activity pattern image.

Thus, activity estimation system 1 has a feature value calculation function to calculate an image feature value for each brain network based on functional magnetic resonance imaging measurement data (fMRI measurement data).

In the description above, an example of calculating a feature value for a network and a subnetwork described in NPL 2 is shown. Currently, however, definition of a brain network has not completely been established, and a feature value may be calculated under the definition of other networks or other functional ROIs.

[F. Correlation Evaluation]

"(4) Correlation evaluation" shown in FIG. 1 will now be described. In correlation evaluation, correlation between each module (network) which implements feature estimation model 10 and the resting state network (RSN) is evaluated.

Figure 9:
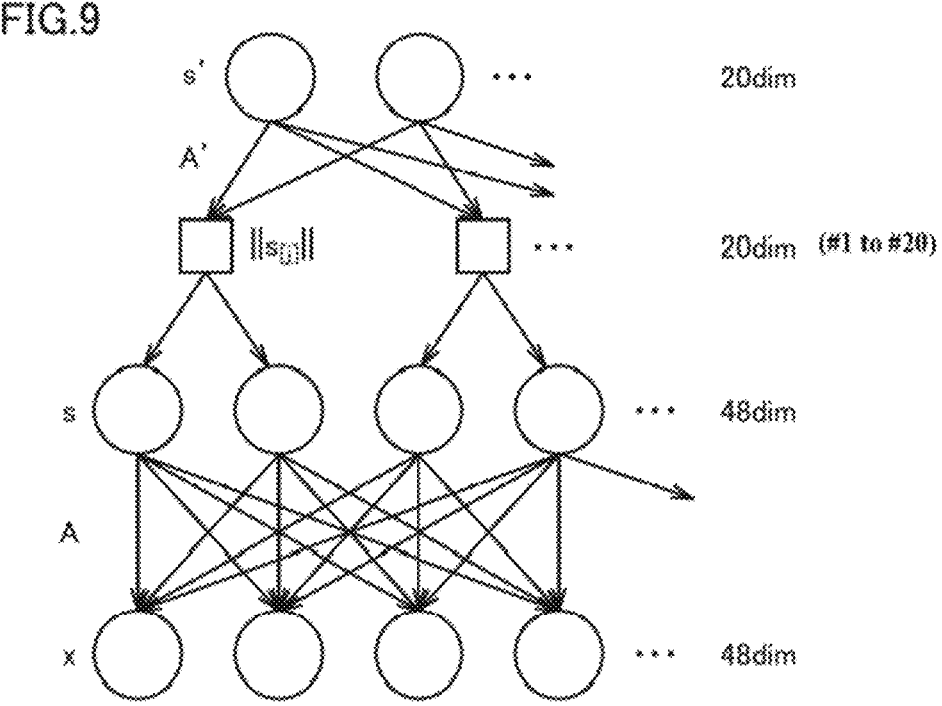
FIG. 9 is a diagram showing one example of a size of each element of a feature estimation model according to the present embodiment.

FIG. 9 is a diagram showing one example of a size of each element of feature estimation model 10 according to the present embodiment. Referring to FIG. 9, EEG measurement data representing input data (input vector x) is 48-dimensional (48 vectors), for which source vector s as many as input vector x in number of dimensions (48-dimension) is set. A module (network) associated with source vector s and a higher-order layer associated with the module are each 20-dimensional (20 vectors).

The number of modules of feature estimation model 10 may be determined in advance by leave-one-session-out cross-validation based on likelihood.

Figure 10:
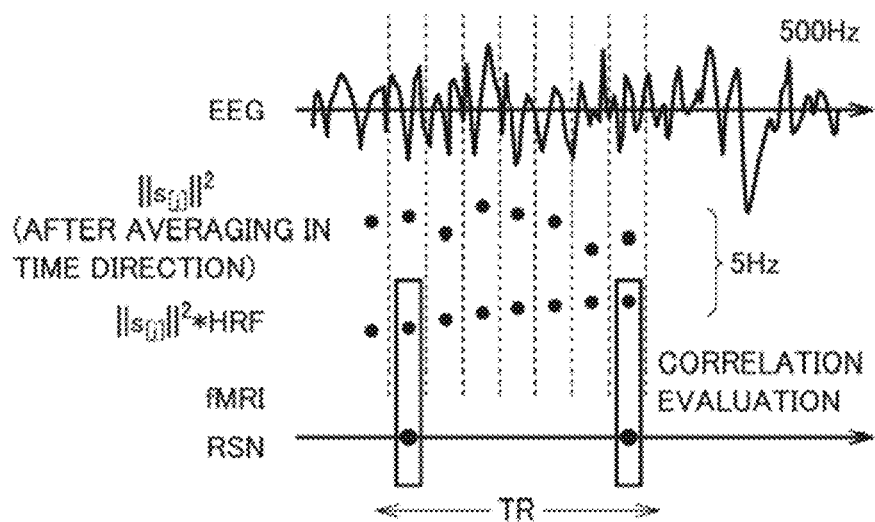
FIG. 10 is a schematic diagram for illustrating a processing procedure in evaluating correlation in the activity estimation system according to the present embodiment.

FIG. 10 is a schematic diagram for illustrating a processing procedure in evaluating correlation in activity estimation system 1 according to the present embodiment. Referring to FIG. 10, by way of example, a sampling cycle of EEG measurement data of each channel is assumed as 2 msec. (a sampling frequency of 500 Hz). Such EEG measurement data is subjected to standard preprocessing such as removal of artifacts, frequency filtering, and dimensionality reduction by principal component analysis, and thereafter to processing for determining a parameter of feature estimation model 10 as described above.

For example, one epoch is set every ten times of sampling (a time window of 20 msec.). A parameter is determined by maximum likelihood estimation by using a loss $L_{epoch}$ for feature estimation model 10 in which time pooling processing has been introduced. Then, powers $\|s_{[j]}\|^2$ of source vector s representing a feature value of each module (network) of feature estimation model 10 are calculated in accordance with the determined parameter and averaged in the time direction in each epoch. The resultant average of powers is output as the feature value (powers or an activity factor) of each module.

When the number of samples per each epoch shown in FIG. 7 described above is set to "10", powers $\|s_{[j]}\|^2$ of final source vector s (averaged in the time direction) is calculated every 200 msec. (sampling frequency of 5 Hz).

Correspondence with the RSN is evaluated by using a result of application (that is, convolution integral) of a hemodynamic response function (HRF) to chronological data of powers of calculated source vector s. Such powers of source vector s are calculated for each module (network) which implements feature estimation model 10.

Combination of results in eight sessions of fMRI (at most five minutes per one session) with eyes of each subject being open is used as fMRI measurement data. Time to repeat (TR) of RF pulses is set to 2.45 seconds and total powers are standardized among the sessions. In EEG measurement, a filter from 8 to 12 Hz (in an α wave mode) is applied.

Correlation between chronological data of a feature value exhibited by each of modules (networks) that is prepared through the procedure as above and each RSN is evaluated. Activity estimation system 1 has a determination function to determine one or more modules which express activities of a specific brain network among a plurality of modules (networks) by evaluating correlation between a calculated feature value for each module (network) of feature estimation model 10 and a calculated image feature value for each brain network.

[G. Identification of Module Which Expresses Brain Network Activity]

Exemplary evaluation for "(5) identification of module which expresses brain network activity" shown in FIG. 1 will now be described. In processing for identifying a module, with which module among a plurality of modules (twenty modules in the example described above) that implement feature estimation model 10 each RSN highly correlates is evaluated. In other words, to which module among the plurality of modules that implement feature estimation model 10 attention should be paid for estimating a value of each RSN is identified.

When to which module each RSN is relevant can be identified, an activity factor of each RSN can be estimated from EEG measurement data obtained more easily than fMRI, and the activity factor can be applied, for example, to neurofeedback.

In the description below, each of twenty modules (networks) which implement feature estimation model 10 shown in FIG. 9 is identified by giving them numbers from #1 to #20 for the sake of convenience.

(g1: Measurement Example 1 (DMN))

In the present measurement example as described above, two modules exhibit relatively strong correlation with the default mode network (DMN).

Figure 11:
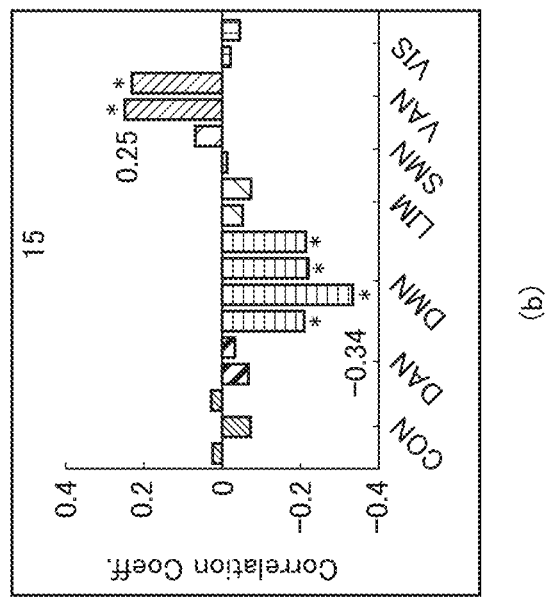
FIG. 11 is a diagram showing a result of measurement which exhibits relatively strong correlation with a default mode network (DMN).
Figure 11:
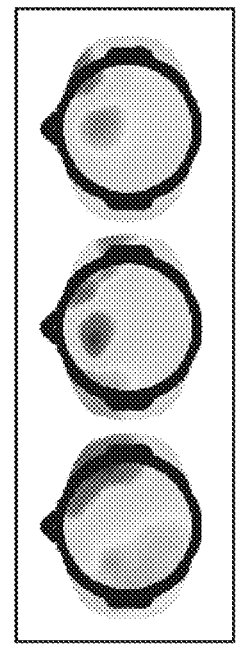

FIG. 11 is a diagram showing a result of measurement which exhibits relatively strong correlation with the default mode network (DMN). FIG. 11(a) shows one example of a brain activity pattern image corresponding to a state that the default mode network (DMN) and the ventral attention network (VAN) are activated. FIG. 11(b) shows one example of evaluation of correlation of module #15.

The abscissa in correlation evaluation shown in FIG. 11(b) corresponds to seventeen ROIs set for a brain activity pattern image and the ordinate corresponds to a correlation value. "*" is added to an ROI which exhibits significant correlation (of which p value after permutation test and multiple comparison correction is smaller than 0.05 in present correlation evaluation). A graph of correlation evaluation may show also a calculated correlation value. This is also applicable to examples of results of correlation evaluation below.

As shown in FIG. 11, it can be seen that module #15 exhibits relatively strong negative correlation with the DMN and relatively strong positive correlation with the VAN. This result indicates that an activation factor of the DMN and the VAN can be estimated by paying attention to a feature value exhibited by module #15.

Figure 12:
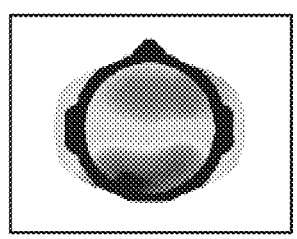
FIG. 12 is a diagram showing a result of measurement which exhibits relatively strong correlation with one sub-network of the default mode network (DMN).
Figure 12:
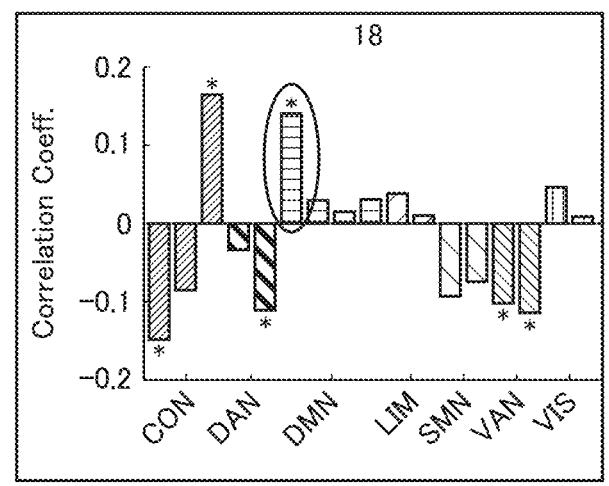

FIG. 12 is a diagram showing a result of measurement which exhibits relatively strong correlation with one subnetwork of the default mode network (DMN). FIG. 12(a) shows one example of a brain activity pattern image corresponding to a state that the default mode network (DMN) is activated. FIG. 12(b) shows one example of correlation evaluation of module #18.

As shown in FIG. 12, it can be seen that module #18 exhibits relatively strong positive correlation with one subnetwork of the DMN. This result indicates that a feature value exhibited by module #18 is useful for estimation of an activity factor of DMN.

(g2: Measurement Example 2 (CON))

In the present measurement example, three modules exhibit relatively strong correlation with the control network (CON).

Figure 13:
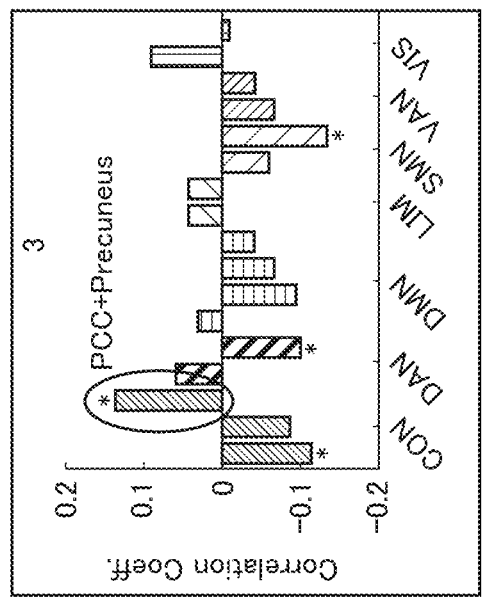
FIG. 13 is a diagram showing a result of measurement which exhibits relatively strong correlation with a control network (CON).
Figure 13:
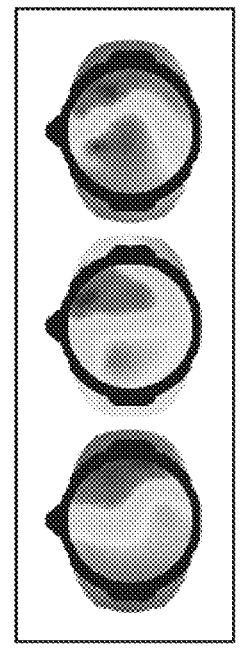

FIG. 13 is a diagram showing a result of measurement which exhibits relatively strong correlation with the control network (CON). FIG. 13(a) shows one example of a brain activity pattern image corresponding to a state that the control network (CON) is activated. FIG. 13(b) shows one example of correlation evaluation of module #3.

As shown in FIG. 13, it can be seen that module #3 exhibits relatively strong positive correlation with one subnetwork (posterior cingulate cortex+precuneus (PCC+Precuneus)) of the CON.

Figure 14:
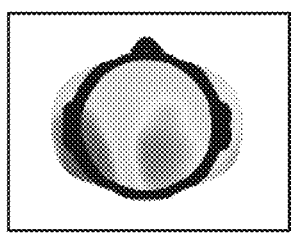
FIG. 14 is a diagram showing another result of measurement which exhibits relatively strong correlation with the control network (CON).
Figure 14:
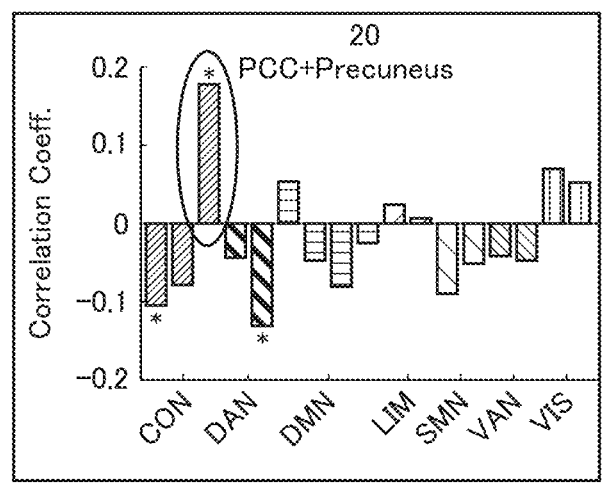

FIG. 14 is a diagram showing another result of measurement which exhibits relatively strong correlation with the control network (CON). FIG. 14(a) shows one example of a brain activity pattern image corresponding to a state that the control network (CON) is activated. FIG. 14(b) shows one example of correlation evaluation of module #20.

As shown in FIG. 14, it can be seen that module #20 also exhibits relatively strong positive correlation with one subnetwork (posterior cingulate cortex+precuneus (PCC+Precuneus)) of the CON.

It can be seen that module #18 shown in FIG. 12 described above also exhibits relatively strong positive correlation with one subnetwork (posterior cingulate cortex+precuneus (PCC+Precuneus)) of the CON.

It can further be seen that each of modules #3, #18, and #20 exhibits relatively strong negative correlation with the dorsal attention network (DAN) and the somatomotor network (SMN).

The results as above indicate that feature values exhibited by modules #3, #18, and #20 are useful for estimation of an activation factor of the CON, an activation factor of the DAN, and an activation factor of the SMN.

(g3: Measurement Example 3 (DAN))

In the present measurement example, three modules exhibit relatively strong correlation with the dorsal attention network (DAN).

Figure 15:
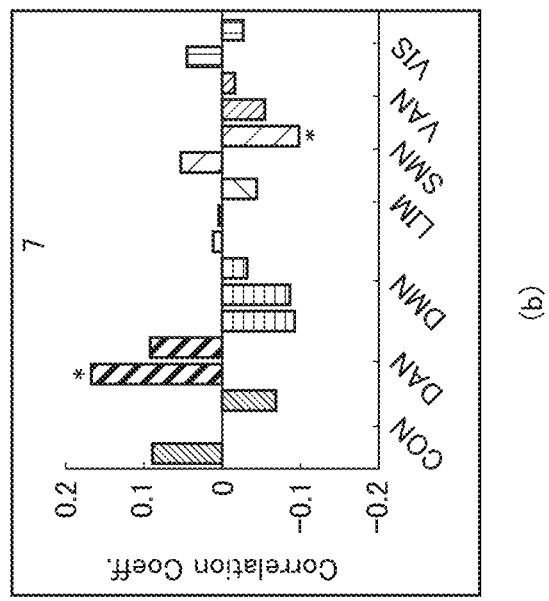
FIG. 15 is a diagram showing a result of measurement which exhibits relatively strong correlation with a dorsal attention network (DAN).
Figure 15:
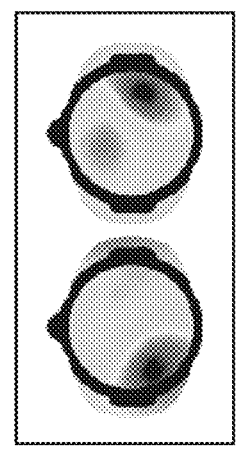

FIG. 15 is a diagram showing a result of measurement which exhibits relatively strong correlation with the dorsal attention network (DAN). FIG. 15(a) shows one example of a brain activity pattern image corresponding to a state that the dorsal attention network (DAN) is activated. FIG. 15(b) shows one example of correlation evaluation of module #7.

As shown in FIG. 15, it can be seen that module #7 exhibits relatively strong positive correlation with one subnetwork of the DAN.

Figure 16:
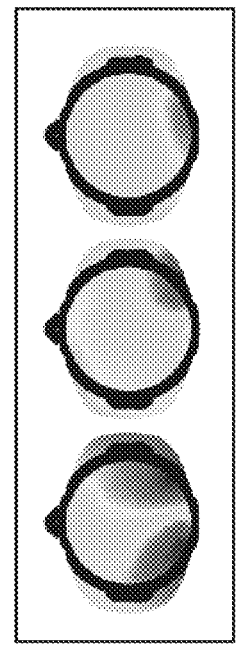
FIG. 16 is a diagram showing another result of measurement which exhibits relatively strong correlation with the dorsal attention network (DAN).
Figure 16:
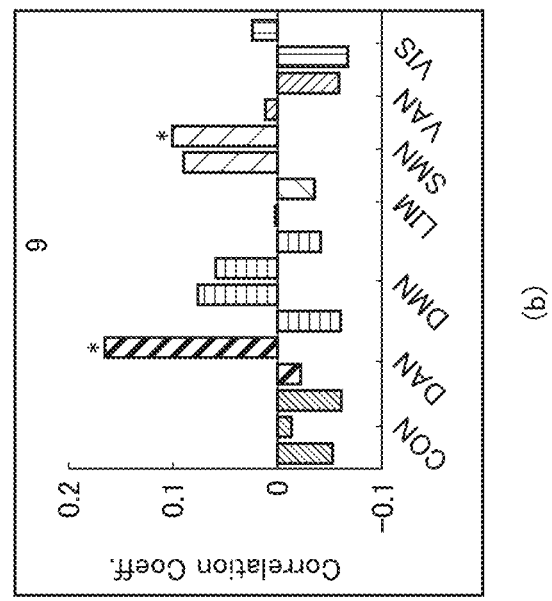

FIG. 16 is a diagram showing another result of measurement which exhibits relatively strong correlation with the dorsal attention network (DAN). FIG. 16(a) shows one example of a brain activity pattern image corresponding to a state that the dorsal attention network (DAN) is activated. FIG. 16(b) shows one example of correlation evaluation of module #9.

As shown in FIG. 16, it can be seen that module #9 exhibits relatively strong positive correlation with one subnetwork of the DAN.

It can further be seen that modules #7 and #9 exhibit relatively strong correlation (positive or negative) to the somatomotor network (SMN).

The results as above indicate that feature values exhibited by modules #7 and #9 are useful for estimation of an activation factor of the DAN and an activation factor of the SMN.

(g4: Measurement Example 4 (SMN/VIS/LIM))

Figure 17:
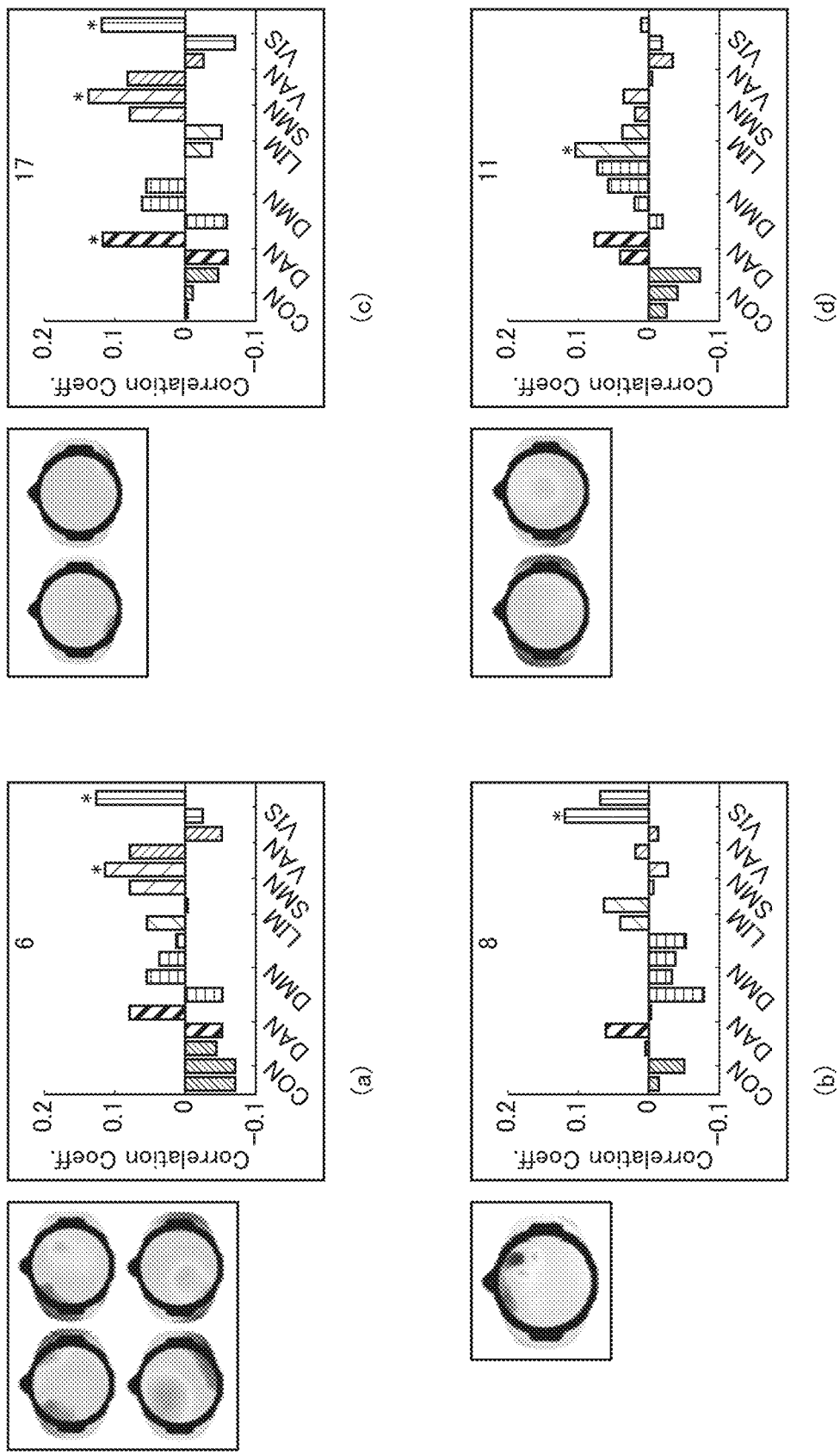
FIG. 17 is a diagram showing a result of measurement in connection with another module.

In the present measurement example, some other modules exhibit relatively strong correlation with the somatomotor network (SMN), the limbic system (LIM), and/or the visual network (VIS). FIG. 17 is a diagram showing a result of measurement in connection with another module.

FIG. 17(a) shows one example of correlation evaluation of module #6. As shown in FIG. 17(a), module #6 exhibits relatively strong correlation with the SMN and the VIS.

FIG. 17(b) shows one example of correlation evaluation of module 8. As shown in FIG. 17(b), module #8 exhibits relatively strong correlation with the VIS.

FIG. 17(c) shows one example of correlation evaluation of module #17. As shown in FIG. 17(c), module #17 exhibits relatively strong correlation with the SMN and the VIS.

FIG. 17(d) shows one example of correlation evaluation of module #11. As shown in FIG. 17(d), module #11 exhibits relatively strong correlation with the LIM.

(g5: Measurement Example 5)

Modules other than the modules described above do not exhibit significant correlation with any brain network.

[H. Functional Configuration of Processing Apparatus]

One example of a functional configuration implemented in processing apparatus 100 of activity estimation system 1 according to the present embodiment will now be described.

Figure 18:
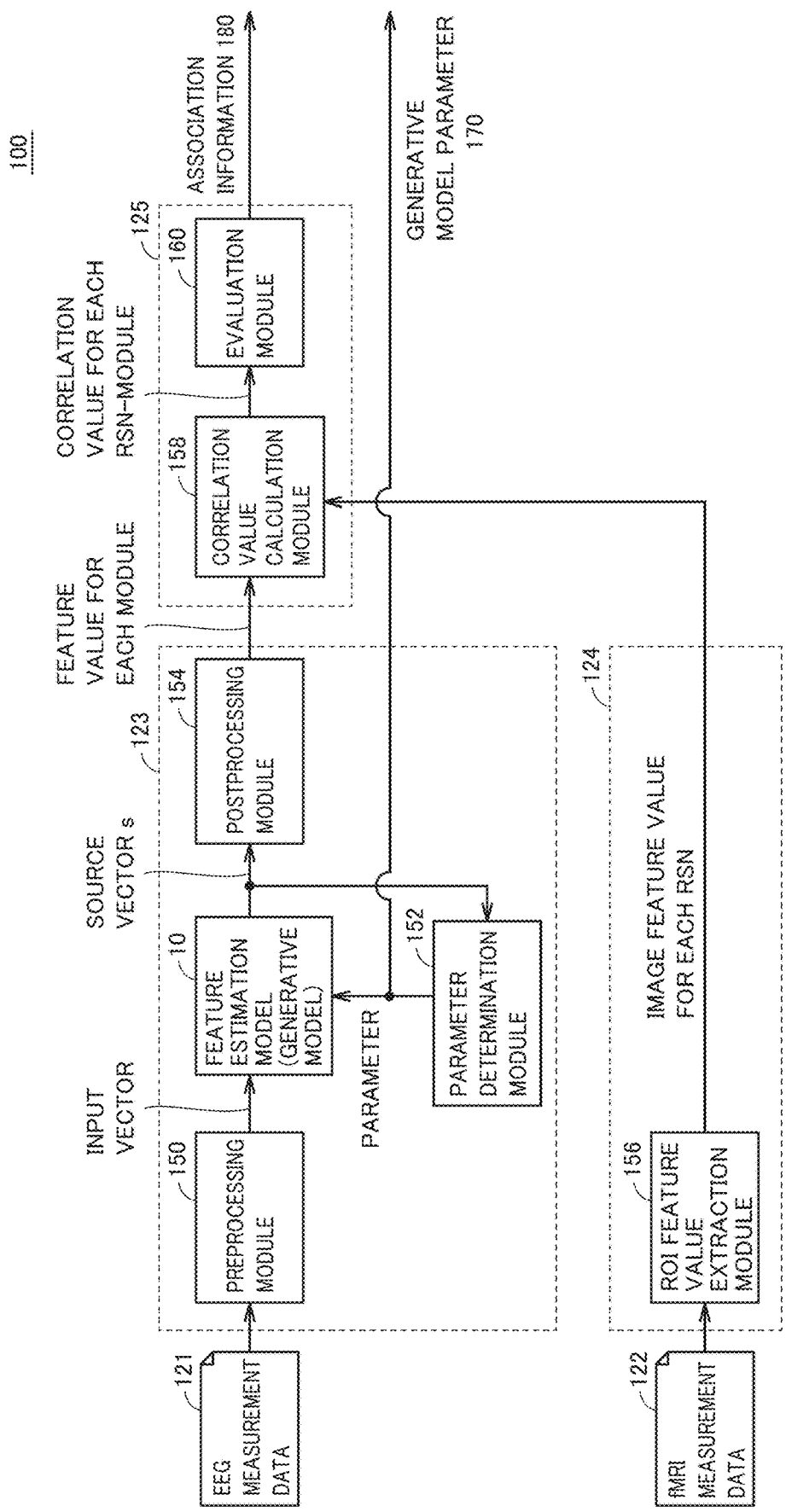
FIG. 18 is a schematic diagram showing an exemplary functional configuration of a processing apparatus of the activity estimation system according to the present embodiment.

FIG. 18 is a schematic diagram showing an exemplary functional configuration of processing apparatus 100 of activity estimation system 1 according to the present embodiment. Each function shown in FIG. 18 is performed by execution of module estimation program 123, brain network activity estimation program 124, and evaluation program 125 by processor 102 of processing apparatus 100. These programs correspond to brain network activity estimation programs according to the present embodiment. For the sake of convenience of description, an implementation by three programs is merely shown, and the implementation may be achieved by fewer programs or more programs.

These programs may be executed by one processor or a plurality of processors in processing apparatus 100 or by a plurality of processing apparatuses in coordination with one another. In the latter example, a plurality of computers arranged on a network, or what is called a cloud system, may be used. Furthermore, instead of a configuration implemented by execution of a program by the processor (software implementation), the entirety or a part thereof may be implemented by a hard-wired configuration such as a field-programmable gate array (FPGA) or an application specific integrated circuit (ASIC).

Each program according to the present embodiment may be mounted in such a form of use as utilizing a function provided by an operating system (OS), and such an example may also be encompassed in the technical scope of the invention of the present application.

Referring to FIG. 18, processing apparatus 100 includes a preprocessing module 150, a parameter determination module 152, a postprocessing module 154, an ROI feature value extraction module 156, a correlation value calculation module 158, and an evaluation module 160.

Preprocessing module 150, parameter determination module 152, and postprocessing module 154 among these modules are implemented by module estimation program 123 (FIG. 3), ROI feature value extraction module 156 is implemented by brain network activity estimation program 124, and 125 evaluation module 160 is implemented by evaluation program 125.

Preprocessing module 150 generates input vector x input from EEG measurement data 121 to feature estimation model 10. More specifically, preprocessing module 150 performs pooling processing or filtering processing of chronological data of each channel included in EEG measurement data 121.

Parameter determination module 152 determines a parameter (a coefficient matrix or a mapping function) which implements feature estimation model 10. Specifically, parameter determination module 152 estimates, based on a loss function (see the expression (5) described above or the like) including as a factor, a value (powers/a square sum) of source vector s calculated by receiving input of input vector x generated by preprocessing module 150 to feature estimation model 10, a parameter which minimizes a value of the loss function.

Postprocessing module 154 performs postprocessing of a value of source vector s output from feature estimation model 10 in accordance with the parameter determined by parameter determination module 152. Specifically, postprocessing module 154 divides the value of source vector s (a vector of a square sum) output from feature estimation model 10 into epochs every prescribed time period and performs pooling processing (time averaging processing) for each epoch.

ROI feature value extraction module 156 outputs an image feature value of a portion (ROI) relevant to a brain network, of fMRI measurement data (one brain activity pattern image or a plurality of brain activity pattern images) output from fMRI measurement apparatus 300. An image feature value is output from ROI feature value extraction module 156 for each RSN.

Correlation value calculation module 158 calculates a value of correlation between a feature value for each module output from postprocessing module 154 and an image feature value for each RSN. An output from correlation value calculation module 158 is defined as a correlation value for each combination of a module and an RSN.

Evaluation module 160 outputs as association information 180, information which identifies a module strongly relevant to each resting state brain network (RSN) based on a correlation value for each combination of a module and an RSN from correlation value calculation module 158. Association information 180 is determined in advance in association with each subject, and identifies one or more modules which express activities of a specific brain network among a plurality of modules which implement feature estimation model 10.

In general, association information 180 represents intensity of influence (relevance) by each of a plurality of modules which implement feature estimation model 10 onto activities of a specific brain network. Therefore, activities of each brain network can also be expressed as weighted linear combination of feature values which appear in the plurality of modules that implement feature estimation model 10.

Thus, processing apparatus 100 obtains brain wave measurement data (EEG measurement data) and functional magnetic resonance imaging measurement data (fMRI measurement data) simultaneously obtained from a subject.

A parameter determined by parameter determination module 152 (generative model parameter 170) is also output. Feature estimation model 10 can be reproduced by using generative model parameter 170.

As described above, in activity estimation system 1 according to the present embodiment, the training process includes processing for determining generative model parameter 170 for constructing feature estimation model 10 (contents in [D. Module Estimation] described above) and processing for determining association information 180 which identifies one or more modules which express activities of a specific brain network (contents in [F. Correlation Evaluation] and [G. Identification of Module Which Expresses Brain Network Activity] described above).

[I. Processing Procedure]

Figure 19:
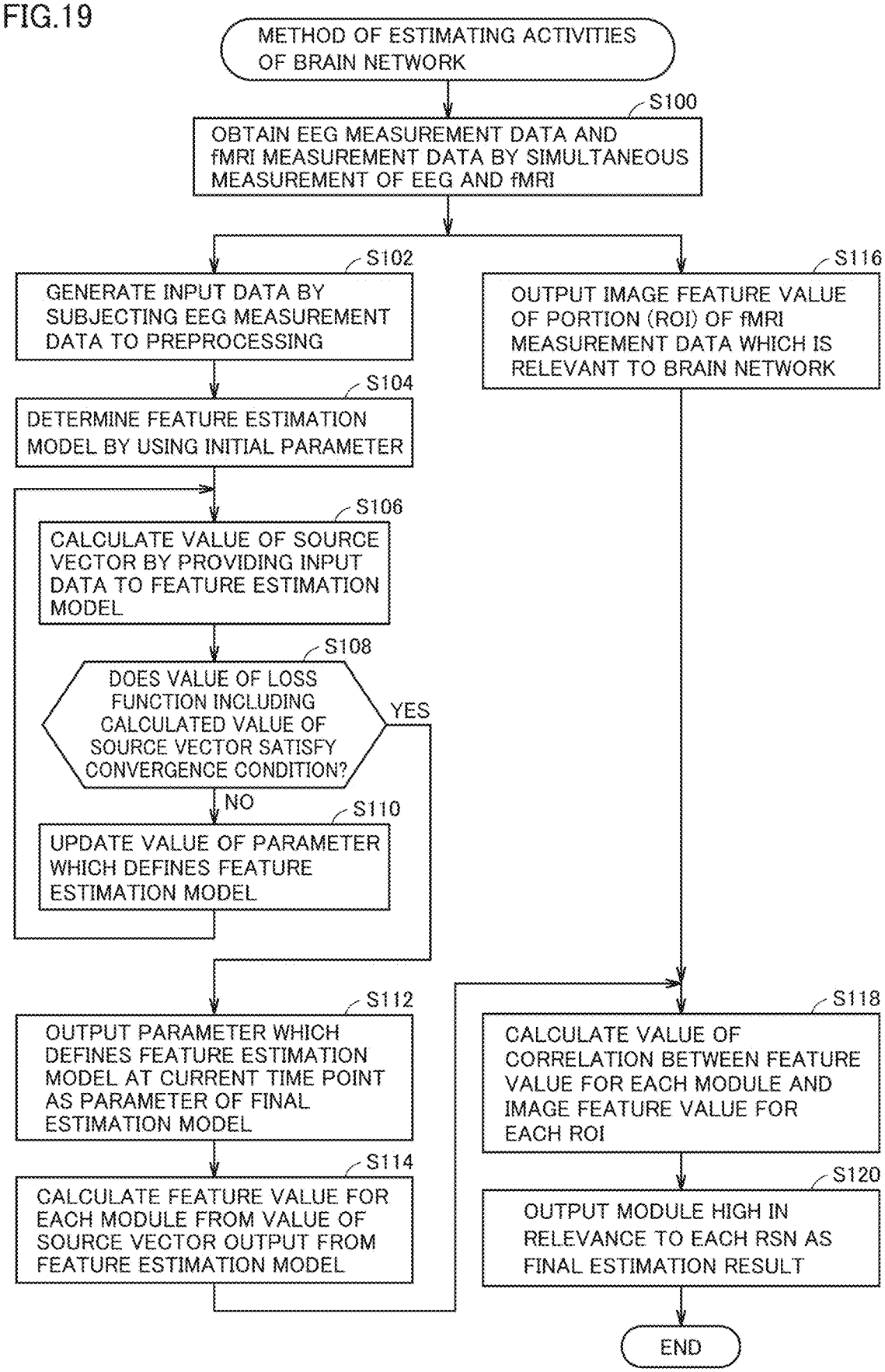
FIG. 19 is a flowchart showing a processing procedure in a method of estimating activities of a brain network according to the present embodiment.

A processing procedure in the method of estimating activities of a brain network according to the present embodiment will now be described. FIG. 19 is a flowchart showing a processing procedure in the method of estimating activities of a brain network according to the present embodiment. Some steps shown in FIG. 19 may be performed by execution of a program in processing apparatus 100.

Referring to FIG. 19, initially, EEG measurement data and fMRI measurement data are obtained by simultaneous measurement of EEG and fMRI (step S100).

In succession, processing apparatus 100 generates input data to be provided to feature estimation model 10 by preprocessing the obtained EEG measurement data (step S102). In succession, processing apparatus 100 determines feature estimation model 10 by using an initial parameter (step S104), and calculates a value of a source vector by providing the input data to determined feature estimation model 10 (step S106). Processing apparatus 100 further determines whether or not a value of a loss function including the calculated value of the source vector satisfies a convergence condition (step S108).

When the value of the loss function does not satisfy the convergence condition (NO in step S108), processing apparatus 100 updates a value of the parameter which defines feature estimation model 10 (step S110) and repeats processing in step S106 and subsequent steps.

When the value of the loss function satisfies the convergence condition (YES in step S108), processing apparatus 100 outputs the parameter which defines feature estimation model 10 at the current time point as a final parameter of feature estimation model 10 (generative model parameter 170) (step S112).

Processing apparatus 100 calculates a feature value for each module from the value of the source vector output from feature estimation model 10 defined by the parameter determined in step S112 (step S114).

In parallel to processing in steps S102 to S114 or after step S114, processing apparatus 100 outputs an image feature value of a portion (ROI) of the fMRI measurement data which is relevant to a brain network (step S116).

Then, processing apparatus 100 calculates a value of correlation between the feature value for each module calculated in step S114 and the image feature value for each ROI calculated in step S116 (step S118). Finally, processing apparatus 100 outputs as final association information 180, information representing a module strongly relevant to each RSN, based on the value of correlation between the feature value for each module and the image feature value for each RSN calculated in step S118 (step S120).

[J. Application]

An application of information (association information 180) on a feature estimation model determined by brain network activity estimation system 1 according to the present embodiment and on a module estimated thereby will now be described. By way of example, application to neurofeedback can be made.

Neurofeedback encompasses a technology to estimate a current brain activity pattern of a subject and take some kind of action onto the subject so as to bring the estimated brain activity pattern closer to a target brain activity pattern.

In measurement of a brain activity pattern by using fMRI, a bulk of fMRI measurement apparatus 300 may restrict implementation thereof. By using a method of estimating a module which expresses activities of a brain network according to the present embodiment, however, a brain activity pattern of a subject can be estimated by using EEG measurement data. The estimation method according to the present embodiment provides an important fundamental technology for putting neurofeedback into widespread use.

Figure 20:
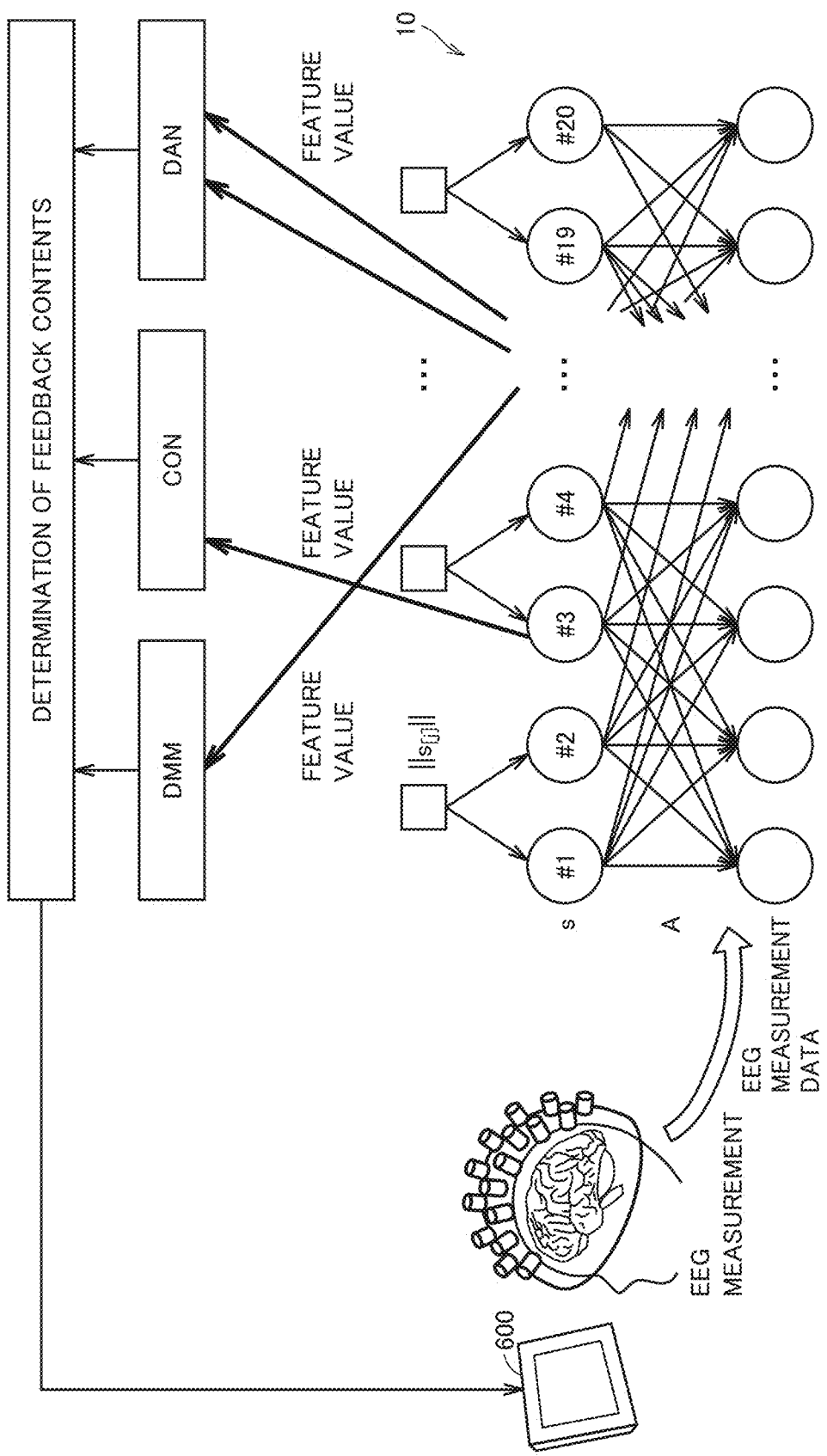
FIG. 20 is a schematic diagram for illustrating an implementation of neurofeedback according to the present embodiment.

FIG. 20 is a schematic diagram for illustrating an implementation of neurofeedback according to the present embodiment. Referring to FIG. 20, feature estimation model 10 is constructed in accordance with a generative model parameter determined in accordance with the processing procedure as described above and EEG measurement data obtained from a subject is provided to constructed feature estimation model 10.

Activity estimation system 1 provides brain wave measurement data (EEG measurement data) obtained from a subject to feature estimation model 10 as input data and calculates a feature value of one or more modules which express activities of at least a specific brain network. Activity estimation system 1 then calculates a value representing a similarity between intensity of activities of the specific brain network and target intensity of activities of a brain activity network based on a feature value calculated in accordance with feature estimation model 10.

By way of example, FIG. 20 shows an example in which activity factors of the default mode network (DMN), the control network (CON), and the dorsal attention network (DAN) are estimated by using a feature value of a specific module estimated in advance, among feature values of modules calculated by using feature estimation model 10. When EEG measurement data is obtained in real time, activities of these brain networks can also be output substantially in real time.

Contents of feedback (a similarity to the target) are determined based on the activities of these brain networks, and the determined contents of feedback are presented to a subject through a presentation apparatus such as a display apparatus 600. At this time, for example, such a presentation approach as allowing a subject to know a current similarity by showing an annular graphic which increases in radius as the similarity is higher is used. For example, the subject is notified in advance that some reward (which may be a monetary reward or another type of reward) will be given when the presented similarity is equal to or higher than a prescribed value. Through such a series of processes, neurofeedback to the subject can be achieved.

Information to be presented to a subject is not limited to the information as described above nor to graphic information, and the information should only allow a subject to recognize a similarity.

Thus, activity estimation system 1 has a feedback function to determine contents of an action to be taken onto a subject based on a value representing intensity of activities of a specific brain network.

In the method of estimating activities of a brain network by using feature estimation model 10 according to the present embodiment, with generative model parameter 170 which defines feature estimation model 10 and information (association information 180) on a module which represents an activity factor of each RSN in feature estimation model 10, activities of a brain network can be estimated in real time. By making use of such advantages, for example, EEG and fMRI are once simultaneously measured by using dedicated facilities, and thereafter treatment based on neurofeedback may be received at any location.

Figure 21:
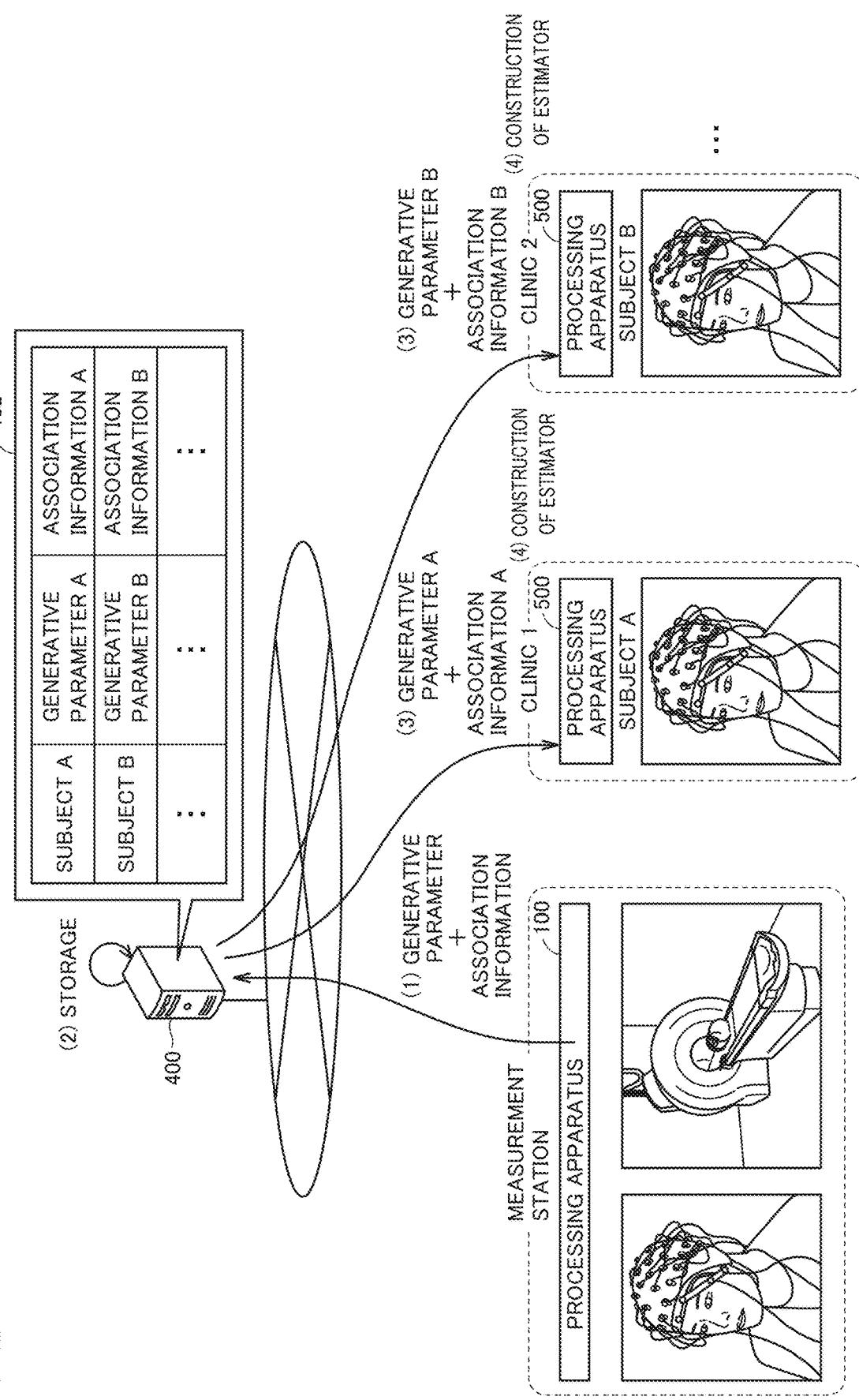
FIG. 21 is a schematic diagram for illustrating an implementation in which the activity estimation system according to the present embodiment is networked.

FIG. 21 is a schematic diagram for illustrating an implementation in which activity estimation system 1 according to the present embodiment is networked. Referring to FIG. 21, for example, at a dedicated measurement station, EEG and fMRI of each subject are simultaneously measured, and processing apparatus 100 outputs generative model parameter 170 which constructs feature estimation model 10 for each subject and corresponding association information 180. Such generative model parameter 170 and association information 180 are transmitted from the measurement station to a server apparatus 400.

Server apparatus 400 holds subject data 402 which stores generative model parameter 170 and association information 180 for each subject.

Not only the measurement station but also a clinic desired by each subject of one or more clinics accesses server apparatus 400 to obtain generative model parameter 170 and association information 180 corresponding to each subject. At each clinic, a processing apparatus 500 as will be described later is arranged and treatment by using neurofeedback as shown in FIG. 20 is practiced based on obtained generative model parameter 170 and association information 180.

Thus, server apparatus 400 stores generative model parameter 170 which defines feature estimation model 10 and information representing one or more modules which express activities of a specific brain network in association with each other for each subject (subject data 402). Server apparatus 400 outputs, in response to a request, generative model parameter 170 corresponding to a specific subject and association information 180 which identifies one or more modules which express activities of a specific brain network.

Widespread use of treatment (treatment of diseases) by using neurofeedback can further be promoted by using a network system as shown in FIG. 21.

One example of a functional configuration implemented in processing apparatus 500 of activity estimation system 1 according to the present embodiment shown in FIG. 21 will now be described. Since processing apparatus 500 is similar in configuration to processing apparatus 100 shown in FIG. 3 described above, detailed description will not be repeated.

Figure 22:
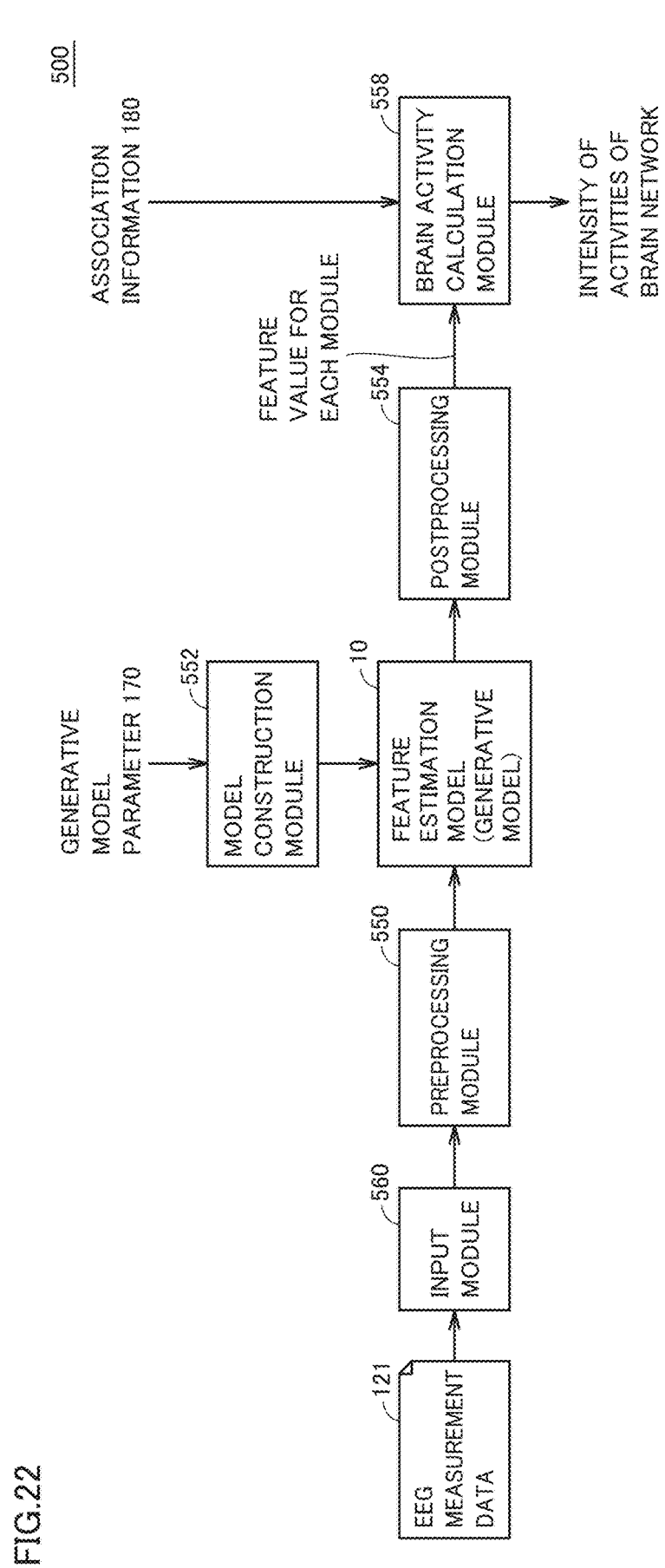
FIG. 22 is a schematic diagram showing an exemplary functional configuration of the processing apparatus of the activity estimation system according to the present embodiment.

FIG. 22 is a schematic diagram showing an exemplary functional configuration of processing apparatus 500 of activity estimation system 1 according to the present embodiment. Each function shown in FIG. 22 is performed by execution of a brain network activity estimation program (similar to brain network activity estimation program 124 shown in FIG. 3) by a processor of processing apparatus 500.

The program may be executed by one or more processors in processing apparatus 500 or by a plurality of processing apparatuses in coordination with one another. In the latter example, a plurality of computers arranged on a network, or what is called a cloud system, may be used. Furthermore, instead of a configuration implemented by execution of a program by the processor (software implementation), the entirety or a part thereof may be implemented by a hard-wired configuration such as an FPGA or an ASIC.

Each program according to the present embodiment may be mounted in such a form of use as utilizing a function provided by an OS, and such an example may also be encompassed in the technical scope of the invention of the present application.

Referring to FIG. 22, processing apparatus 500 includes an input module 560, a preprocessing module 550, a model construction module 552, feature estimation model 10, a postprocessing module 554, and a brain activity calculation module 558.

Input module 560 obtains EEG measurement data 121 which is brain wave measurement data obtained from a subject. Input module 560 may directly be connected to an EEG measurement apparatus or may be mounted as a part of the EEG measurement apparatus. Alternatively, input module 560 may accept EEG measurement data 121 through any medium from the EEG measurement apparatus.

Preprocessing module 550 generates from EEG measurement data 121, input vector x to be input to feature estimation model 10. Since the preprocessing module is similar in basic function to preprocessing module 150 shown in FIG. 18, detailed description will not be repeated.

Model construction module 552 constructs, by using generative model parameter 170 determined by advance parameter estimation processing and determined in advance in association with each subject, feature estimation model 10 which receives brain wave measurement data as input data.

Model construction module 552 sets a corresponding parameter for each element of a network structure prepared in advance.

Postprocessing module 554 performs postprocessing on a value of each source vector s calculated in response to input of the input vector from preprocessing module 550 to feature estimation model 10. Specifically, postprocessing module 554 divides a value of source vector s (a vector of a square sum) output from feature estimation model 10 into epochs every prescribed time period and performs pooling processing (time averaging processing) for each epoch.

Brain activity calculation module 558 outputs based on association information 180, a value representing intensity of activities of each brain network based on a feature value of each module output from postprocessing module 554. Association information 180 refers to information (one or more parameters) for identifying one or more modules which express activities of a specific brain network among a plurality of modules. A value representing intensity of activities of a brain network output from brain activity calculation module 558 may be used for neurofeedback as described above.

Thus, preprocessing module 550, postprocessing module 554, and brain activity calculation module 558 provide brain wave measurement data (EEG measurement data 121) obtained from a subject to feature estimation model 10 as input data, based on association information 180 determined in advance in association with the subject, and calculates a value representing intensity of activities of a specific brain network from a feature value of one or more modules which express activities of the specific brain network.

Figure 23:
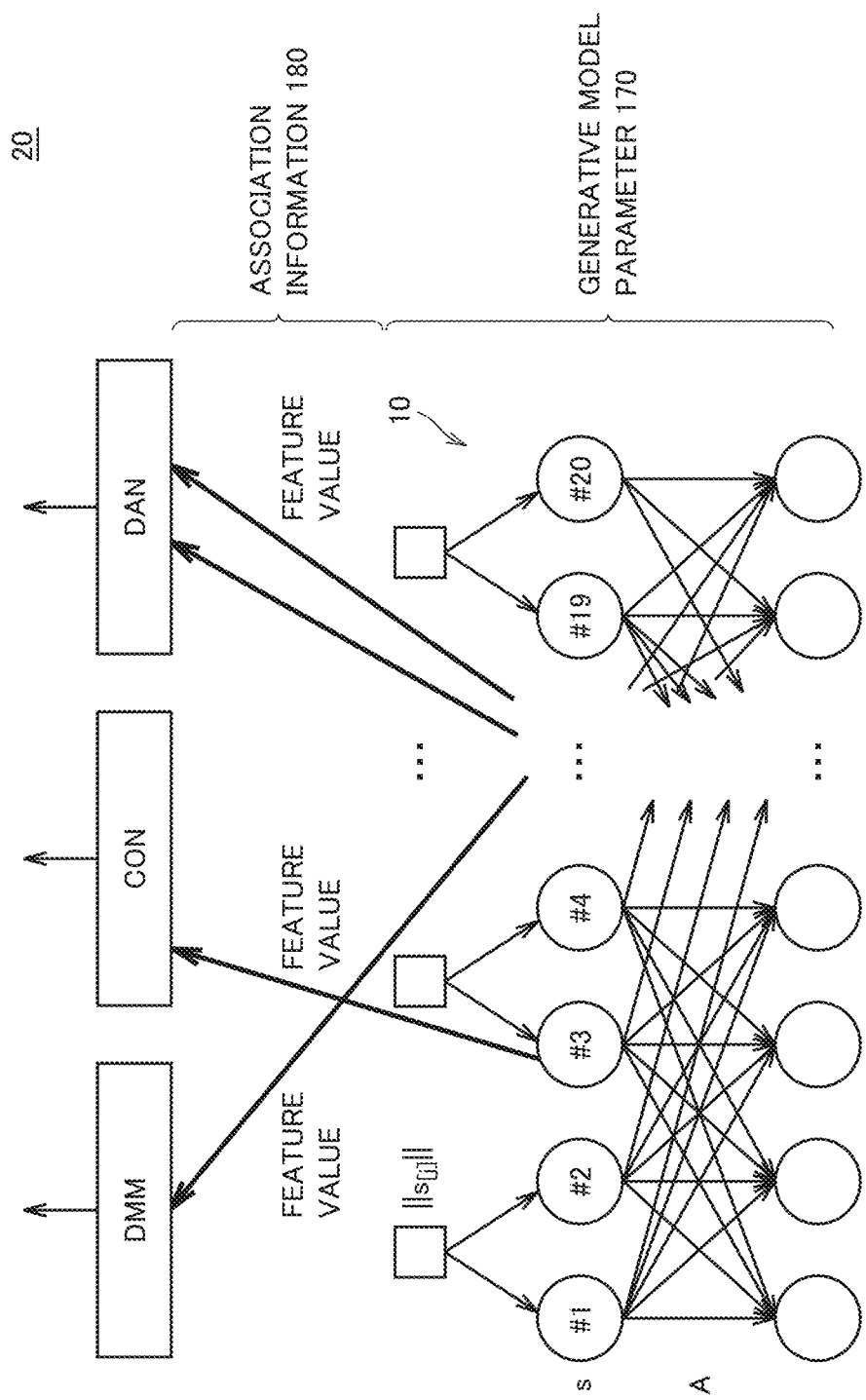
FIG. 23 is a schematic diagram showing a brain activity estimator obtained in a training process in the activity estimation system according to the present embodiment.

FIG. 23 is a schematic diagram showing a brain activity estimator 20 obtained in a training process in activity estimation system 1 according to the present embodiment. Referring to FIG. 23, brain activity estimator 20 outputs a value representing intensity of activities of a specific brain network of a subject by receiving input of brain wave measurement data obtained from the subject.

Brain activity estimator 20 refers to a trained brain activity estimation model composed of feature estimation model 10 (a first model) determined by machine learning using brain wave measurement data obtained from a subject and association information (a second model) determined by machine learning using fMRI measurement data obtained from the subject.

Feature estimation model 10 included in brain activity estimator 20 includes a plurality of elements (sources) representing signal sources in the brain and a plurality of modules each correlated with at least one of the plurality of elements. Each of the plurality of elements is defined as linear combination of values corresponding to dimensions of brain wave measurement data.

Association information 180 included in brain activity estimator 20 is determined in advance in association with a subject. Association information 180 identifies one or more modules which express activities of a specific brain network among a plurality of modules which implement feature estimation model 10. When feature estimation model 10 estimates a higher-order factor, one or more parameters which identify one or more higher-order factors which express activities of a specific brain network may be employed as association information 180.

By adopting such brain activity estimator 20, activities of various brain networks can relatively quickly be estimated by using signals of brain waves measured by a relatively simplified method such as EEG measurement.

Figure 24:
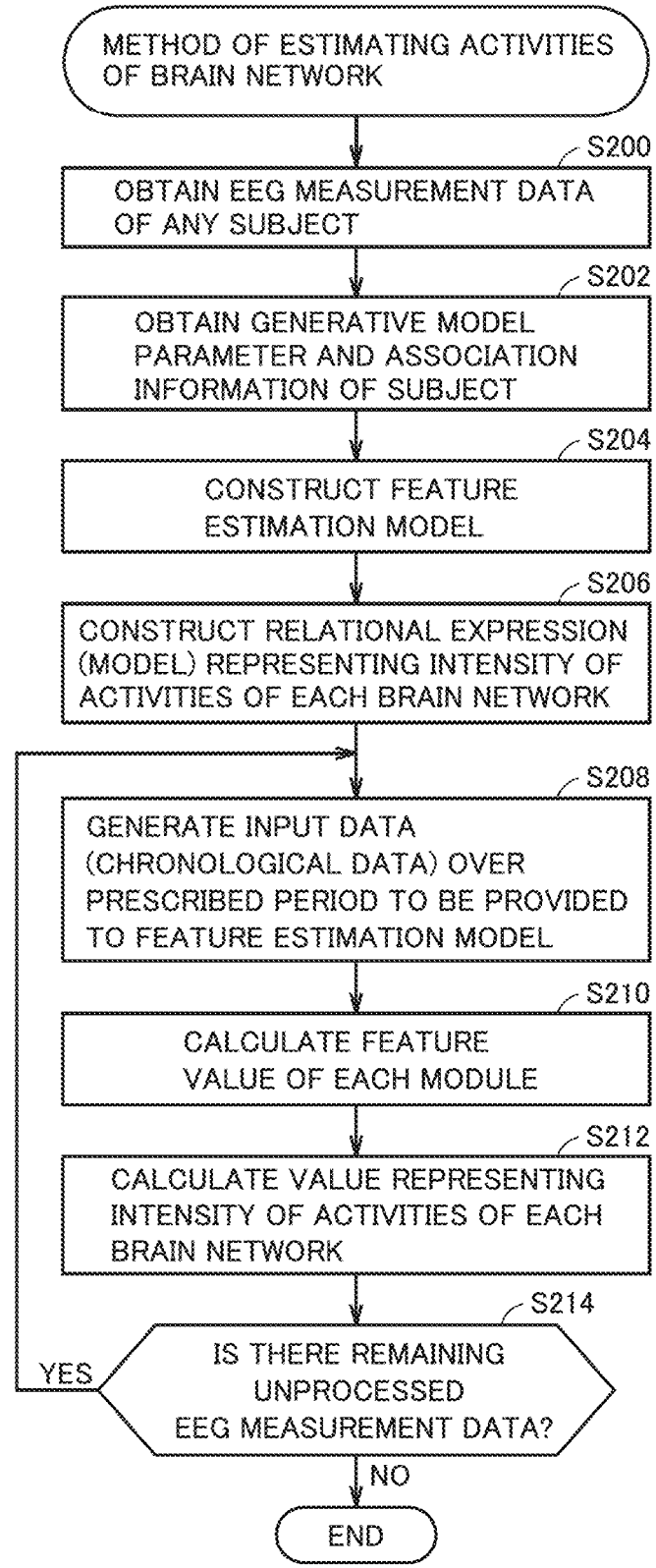
FIG. 24 is a flowchart showing a processing procedure in another method of estimating activities of a brain network according to the present embodiment.

A processing procedure in the method of estimating activities of a brain network in processing apparatus 500 of activity estimation system 1 according to the present embodiment will now be described. FIG. 24 is a flowchart showing a processing procedure in another method of estimating activities of a brain network according to the present embodiment. Some steps shown in FIG. 24 may be performed by execution of a program in processing apparatus 500.

Referring to FIG. 24, initially, processing apparatus 500 obtains EEG measurement data of any subject (step S200). In succession, processing apparatus 500 obtains generative model parameter 170 and association information 180 determined in advance for the subject (step S202), constructs feature estimation model 10 (step S204), and constructs a relational expression (model) representing intensity of activities of each brain network from a feature value exhibited by each module of feature estimation model 10 (step S206).

In succession, processing apparatus 500 generates input data over a prescribed period (chronological data) provided to feature value module 10 by preprocessing the obtained EEG measurement data (step S208) and calculates a feature value of each module which appears as a result of generated input data being provided to feature estimation model 10 (step S210). Processing apparatus 500 then calculates a value representing intensity of activities of each brain network from a feature value exhibited by each module (step S212).

Processing apparatus 500 determines whether or not there remains unprocessed EEG measurement data obtained in step S200 (step S214), and when there remains unprocessed data (YES in step S214), it repeats processing in step S208 and subsequent steps. When there remains no unprocessed data (NO in step S214), processing apparatus 500 quits the process.

Any processing using a value representing intensity of activities of a brain network sequentially calculated in step S212 can be added.

[K. Advantage]

According to the brain network activity estimation system according to the present embodiment, brain wave signals resulting from multi-channel measurement are analyzed and an activity factor of a brain network premised on a plurality of signal sources in the brain can be quantified. In the present embodiment, since a position of a signal source in the brain does not have to explicitly be determined in a feature estimation model, measurement of a shape of the brain or the skull or inverse problem analysis is not necessary in principle. Namely, versatility is higher and higher-speed processing can be performed with an amount of operation processing being reduced.

It has been shown in evaluation experiments using the brain network activity estimation system according to the present embodiment that there is a module which exhibits a value of relatively strong correlation with a brain network which has been known in the prior art.

According to the brain network activity estimation system according to the present embodiment, intensity of activities of a brain network can be obtained as being quantified, so that development of a quantitative indicator (a biomarker) of psychiatric disorders or developmental disorders is also facilitated.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST

1 activity estimation system; 10 feature estimation model; 12 EEG measurement data; 14 source; 16 module; 18 higher-order factor; 20 brain activity estimator; 100, 500 processing apparatus; 102 processor; 104 main storage; 106 control interface; 108 network interface; 110, 352 input unit; 112, 353 display unit; 120 secondary storage; 121 EEG measurement data; 122 fMRI measurement data; 123 module estimation program; 124 brain network activity estimation program; 125 evaluation program; 150, 550 preprocessing module; 152 parameter determination module; 154, 554 postprocessing module; 156 feature value extraction module; 158 correlation value calculation module; 160 evaluation module; 170 generative model parameter; 180 association information; 200 EEG measurement apparatus; 202 multiplexer; 204 noise filter; 206 A/D converter; 208, 354 storage; 210, 358 interface; 220 sensor; 222 cable; 300 fMRI measurement apparatus; 302 reception coil; 310 magnetic field application mechanism; 312 static magnetic field generation coil; 314 gradient magnetic field generation coil; 316 emitter; 318 bed; 320 driver; 322 static magnetic field power supply; 324 gradient magnetic field power supply; 326 signal transmitter; 328 signal receiver; 330 bed driver; 350 data processing unit; 351 control unit; 356 image processing unit; 357 data collector; 400 server apparatus; 402 subject data; 552 model construction module; 558 brain activity calculation module; 560 input module; 600 display apparatus; S subject

The invention claimed is:

1. A brain network activity estimation system comprising:
   a sensor that generates an electrical signal representing brain waves from a subject;
   a noise filter that removes noise components from the electrical signal; and
   one or more processors with a computer-readable program, configured to perform:
   generating brain wave measurement data based on the electrical signal from the noise filter with removed noise components;
   obtaining the brain wave measurement data and functional magnetic resonance imaging measurement data simultaneously measured from the subject;
   constructing a feature estimation model which receives only the brain wave measurement data as input data and determines a parameter which defines the feature estimation model, the feature estimation model including a plurality of elements representing signal sources in a brain, and a plurality of modules generated from the received brain wave measurement data with each module of the plurality of modules correlated with at least one of the plurality of elements;
   calculating a feature value for each module of the plurality of modules based on an output value from each module of the plurality of modules when the brain wave measurement data is provided as the input data;
   calculating an image feature value for each brain network of a plurality of brain networks, based on the functional magnetic resonance imaging measurement data; and
   determining one or more modules of the plurality of modules which express activities of a specific brain network of the plurality of brain networks among the plurality of modules by evaluating a correlation between the feature value for each module and the image feature value for each brain network, wherein
each module in the plurality of modules is associated with a higher-order factor of the feature estimation model that expresses activities of a brain network in the plurality of brain networks, and
the one or more processors are further configured to perform:
providing the brain wave measurement data measured from the subject to the feature estimation model as the input data;
calculating a feature value of the one or more modules of the plurality of modules which express the activities of at least the specific brain network;
calculating a value representing a similarity between intensity of the activities of the specific brain network and a target intensity of the activities of the specific brain network, based on the feature value of the one or more modules;
displaying the similarity value between the intensity of the activities of the specific brain network and the target intensity of the activities of the specific brain network or an object representing the similarity value, on a display apparatus; and
controlling the display apparatus to provide neurofeedback to the subject in real time by indicating a presence of a graduated increase in the similarity value.

2. The brain network activity estimation system according to claim 1, wherein
each of the plurality of elements is calculated as a linear combination of the input data.

3. The brain network activity estimation system according to claim 1, wherein
the input data is chronological data over a prescribed period, and
the calculating the feature value includes consolidating the chronological data of feature values of each module of the plurality of modules over the prescribed period in a time direction and outputting the chronological data as the feature value for each module of the plurality of modules.

4. The brain network activity estimation system according to claim 1, wherein
the constructing the feature estimation model includes determining the parameter which defines the feature estimation model that produces correlated time waveforms of the elements which are calculated when the brain wave measurement data is provided as the input data.

5. The brain network activity estimation system according to claim 1, further comprising a storage apparatus for storing for each subject of a plurality of subjects, the parameter which defines the feature estimation model and information representing the one or more modules of the plurality of modules which express the activities of the specific brain network in association with each other, wherein
the storage apparatus is configured to output, in response to a request, a parameter corresponding to a specific subject of the plurality of subjects and the information representing the one or more modules of the plurality of modules which express the activities of the specific brain network.

6. A method of estimating activities of a brain network comprising:
generating, by using a sensor, an electrical signal representing brain waves from a subject;
removing, by using a noise filter, noise components from the electrical signal;
generating brain wave measurement data based on the electrical signal from the noise filter with removed noise components;
obtaining the brain wave measurement data and functional magnetic resonance imaging measurement data simultaneously measured from the subject;
constructing a feature estimation model which receives only the brain wave measurement data as input data and determines a parameter which defines the feature estimation model, the feature estimation model including a plurality of elements representing signal sources in a brain, and a plurality of modules generated from the received brain wave measurement data with each module of the plurality of modules correlated with at least one of the plurality of elements;
calculating a feature value for each module of the plurality of modules based on an output value from each module of the plurality of modules when the brain wave measurement data is provided as the input data;
calculating an image feature value for each brain network of a plurality of brain networks based on the functional magnetic resonance imaging measurement data; and
determining one or more modules of the plurality of modules which express activities of a specific brain network of the plurality of brain networks among the plurality of modules by evaluating a correlation between the calculated feature value for each module and the calculated image feature value for each brain network, wherein
each module in the plurality of modules is associated with a higher-order factor of the feature estimation model that expresses activities of a brain network in the plurality of brain networks, and
the method further comprises:
providing the brain wave measurement data measured from the subject to the feature estimation model as the input data;
calculating a feature value of the one or more modules of the plurality of modules which express the activities of at least the specific brain network;
calculating a value representing a similarity between intensity of the activities of the specific brain network and a target intensity of the activities of the specific brain network, based on the feature value of the one or more modules;
displaying the similarity value between the intensity of the activities of the specific brain network and the target intensity of the activities of the specific brain network or an object representing the similarity value, on a display apparatus; and
controlling the display apparatus to provide neurofeedback to the subject in real time by indicating a presence of a graduated increase in the similarity value.

7. A brain network activity estimation system comprising:
a sensor that generates an electrical signal representing brain waves from a subject;
a noise filter that removes noise components from the electrical signal; and one or more processors with a computer-readable program, configured to perform:
    generating brain wave measurement data based on the electrical signal from the noise filter with removed noise components;
    constructing a feature estimation model which receives only the brain wave measurement data as input data, by using a parameter determined in advance in association with the subject, the feature estimation model including a plurality of elements representing signal sources in a brain, and a plurality of modules generated from the received brain wave measurement data with each module of the plurality of modules correlated with at least one of the plurality of elements;
    providing the brain wave measurement data to the feature estimation model as input data based on association information determined in advance in association with the subject, the association information identifying one or more modules of the plurality of modules which express activities of a specific brain network of a plurality of brain networks among the plurality of modules:
        calculating a value representing a similarity between intensity of the activities of the specific brain network and a target intensity of the activities of the specific brain network, from a feature value of the one or more modules of the plurality of modules which express the activities of the specific brain network;
        displaying the similarity value between the intensity of the activities of the specific brain network and the target intensity of the activities of the specific brain network or an object representing the similarity value, on a display apparatus; and
        controlling the display apparatus to provide neurofeedback to the subject in real time by indicating a presence of a graduated increase in the similarity value,
the parameter which defines the feature estimation model being determined to produce correlated time waveforms of elements calculated when the brain wave measurement data is provided as the input data,
the association information being determined by evaluating a correlation between a feature value for each module of the plurality of modules calculated based on an output value from each module of the plurality of modules that is produced when the brain wave measurement data used for determination of the parameter is provided to the feature estimation model as the input data and an image feature value for each brain network of the plurality of brain networks calculated based on functional magnetic resonance imaging measurement data measured from the subject simultaneously with the brain wave measurement data used for determination of the parameter, wherein
each module in the plurality of modules is associated with a higher-order factor of the feature estimation model that expresses activities of a brain network in the plurality of brain networks.

8. A method of estimating activities of a brain network comprising:
    generating, by using a sensor, an electrical signal representing brain waves from a subject;
    removing, by using a noise filter, noise components from the electrical signal;
    generating brain wave measurement data based on the electrical signal from the noise filter with removed noise components;
    constructing a feature estimation model which receives only the brain wave measurement data as input data, by using a parameter determined in advance in association with the subject, the feature estimation model including a plurality of elements representing signal sources in a brain, and a plurality of modules generated from the received brain wave measurement data with each module of the plurality of modules correlated with at least one of the plurality of elements;
    providing the obtained brain wave measurement data to the feature estimation model as input data based on association information determined in advance in association with the subject, the association information identifying one or more modules of the plurality of modules which express activities of a specific brain network of a plurality of brain networks among the plurality of modules,
    calculating a value representing a similarity between intensity of the activities of the specific brain network and a target intensity of the activities of the specific brain network, from a feature value of the one or more modules of the plurality of modules which express the activities of the specific brain network,
    displaying the similarity value between the intensity of the activities of the specific brain network and the target intensity of the activities of the specific brain network or an object representing the similarity value, on a display apparatus; and
    controlling the display apparatus to provide neurofeedback to the subject in real time by indicating a presence of a graduated increase in the similarity value,
    the parameter which defines the feature estimation model being determined to produce correlated time waveforms of elements calculated when the brain wave measurement data is provided as the input data,
    the association information being determined by evaluating a correlation between a feature value for each module of the plurality of modules calculated based on an output value from each module of the plurality of modules that is produced when the brain wave measurement data used for determination of the parameter is provided to the feature estimation model as the input data and an image feature value for each brain network of the plurality of brain networks calculated based on functional magnetic resonance imaging measurement data measured from the subject simultaneously with the brain wave measurement data used for determination of the parameter, wherein
    each module in the plurality of modules is associated with a higher-order factor of the feature estimation model that expresses activities of a brain network in the plurality of brain networks.

* * * * *